United States Patent [19]
Wade et al.

[11] Patent Number: 5,552,776
[45] Date of Patent: Sep. 3, 1996

[54] ENHANCED SECURITY SYSTEM FOR COMPUTING DEVICES

[75] Inventors: Jack Wade, La Jolla, Calif.; William K. Szaroletta, Des Moines, Iowa; Thomas R. Madden, San Diego, Calif.

[73] Assignee: Z-Microsystems, Carlsbad, Calif.

[21] Appl. No.: 265,517

[22] Filed: Jun. 24, 1994

Related U.S. Application Data

[63] Continuation of Ser. No. 763,915, Sep. 23, 1991, abandoned.

[51] Int. Cl.⁶ ........................................................ G06F 7/04
[52] U.S. Cl. .................... 340/825.31; 340/825.3; 340/310.08
[58] Field of Search .......................... 340/825.31, 825.34, 340/825.56, 825.3, 309.15, 309.6, 310.08, 870.16, 870.17; 379/95, 102; 307/139; 235/382

[56] References Cited

U.S. PATENT DOCUMENTS

| | | | |
|---|---|---|---|
| 4,750,197 | 6/1988 | Denekamp et al. | 379/59 |
| 4,823,290 | 4/1989 | Fasack et al. | 340/825.06 |
| 4,849,614 | 7/1989 | Watanabe et al. | 340/825.3 |
| 4,882,564 | 11/1989 | Monroe et al. | 340/870.17 |
| 4,899,217 | 2/1990 | MacFadyen et al. | 379/102 |
| 4,942,606 | 7/1990 | Kaiser et al. | 340/825.31 |
| 4,947,163 | 8/1990 | Henderson et al. | 340/825.31 |
| 5,051,720 | 9/1991 | Kittirutsunetorn | 340/310 CP |
| 5,111,185 | 5/1992 | Kozaki | 340/825.31 |
| 5,144,659 | 4/1992 | Jones | 340/825.31 |

Primary Examiner—John K. Peng
Assistant Examiner—Andrew Hill
Attorney, Agent, or Firm—Loeb & Loeb

[57] ABSTRACT

A security system for controlling access to computing devices. The security system provides selectively programmable access, monitored access, access privilege modifications and recorded access history for a computing device.

35 Claims, 14 Drawing Sheets

OPTIONS TABLE

| | | | | | |
|---|---|---|---|---|---|
| 4008 — | AUTHORIZED DEVICE ID | | | | |
| | MODULE(S), BASE UNIT(S), AND OTHER COMPUTING DEVICES | 0515 | 0516 | 1711 | 1712 |
| 4010 — | AUTHORIZED USERS | | | | |
| 4019 — | NUMBER CONCURRENT AUTHORITATIVE ACCESSES | * | 02 | 02 | 01 |
| 4020 — | ACTION PROGRAM | 461 | 342 | 342 | 342 |
| 4012 — | SUPER USER | | | | |
| 4022 — | SUPERUSER TERM OF OFFICE (DDHH) | 3017 | 3017 | 3017 | 3017 |
| 4023 — | REAUTHORIZATION TIMEDELAY FOR SAME SUPERUSER (HH) | 24 | 12 | 12 | 06 |
| 4025 — | SUPERUSER PRIVILEGE LEVEL (1,2,3,) | 1 | 1 | 2 | 3 |
| 4014 — | DISPLAY | | | | |
| | ALLOW WHICH TABLES DISPLAYED | 001011 | 010011 | 001111 | 111111 |
| | DEFINE CUSTOM DISPLAY | XXXX | XXXX | XXXX | XXXX |
| 4016 — | INPUT/OUTPUT | | | | |
| | LIMIT I/O TO WHICH PORTS | | | | |
| |     SERIAL    (1XXX) | | | 1110 | 0100 |
| |     SCSI    (X1XX) | | | | |
| |     ETHERNET    (XX1X) | | | | |
| |     OTHER    (XXX1) | | | | |
| | ALLOW INPUT FROM WHICH DEVICES | | | | |
| |     CPU    (1XXX) | | | 1110 | 0100 |
| |     BASE UNITS    (X1XX) | | | | |
| |     MODULES    (XX1X) | | | | |
| |     OTHER    (XXX1) | | | | |
| | ALLOW OUTPUT TO DEVICES | | | | |
| |     PRINTER ONLY    (1XX) | | | 110 | 010 |
| |     WINDOW ON HOST CPU    (X1X) | | | | |
| |     OTHER    (XX1) | | | | |
| 4018 — | SPECIAL | | | | |
| | SET SPECIAL AUDIT TRAILS | XXXXX | XXXXX | XXXXX | |
| | OTHER | XXXXX | XXXXX | XXXXX | |

FIG. 1

PASSWORD TABLE

| | AUTHORIZED DEVICE ID | PASSWORD | EXPIRY DATE | ACTION PROGRAM OPCODE |
|---|---|---|---|---|
| 4150 | 0515 | 23942 | 911010 | 01 |
| | 0516 | 98458 | 911111 | 01 |
| | 1711 | 73823 | 911224 | 01 |
| | 1712 | 23498 | 911122 | 01 |
| 4152 | AUTHORIZED USER ID | PASSWORD | | |
| | 01 | * | 920101 | 02 |
| | 02 | 19223 | 920101 | 02 |
| | 03 | 29874 | 920303 | 02 |
| | 04 | 73842 | 911212 | 02 |
| 4154 | AUTHORIZED SITE ID | | | |
| | 34 | 29343 | 911212 | 03 |
| | 35 | 23483 | 911212 | 03 |
| 4156 | AUTHORIZED PROJECT ID | | | |
| | 1234 | 73166 | 911212 | 04 |
| | 1235 | 34283 | 911212 | 04 |
| 4158 | SPECIAL PASSWORDS ID | | | |
| | AS DEFINED | XXXXX | YYMMDD | 05 |
| 4160 | PASSWORD TABLE ACCESS AUDIT IDENTIFIER | | | 06 |
| 4164 | AUTHORIZED DATE | | | |
| 4166 | AUTHORIZED TIME | | | |
| 4162 | LOG-IN ATTEMPTS | | | |
| | TIME OF LOG-IN | | | |
| | NUMBER OF ATTEMPTS | | | |

FIG. 2

AUTHORITIES TABLE

| | | | | | | |
|---|---|---|---|---|---|---|
| 4201 | AUTHORIZED DEVICE ID MODULE(S), BASE UNIT(S), AND OTHER COMPUTING DEVICES | | | 0515 | 0516 | 1711 | 1712 |
| 4212 | AUTHORIZED DEVICE MATE ID MATRIX | | | 1711<br>1712 | 1711 | 0515<br>0516 | 0515 |
| 4203 | AUTHORIZED USER ID(S) | | A)<br>B)<br>C) | 02<br>03<br>04 | 02<br>03 | 02<br>03 | 02<br>04 |
| 4206 | SITE VALIDATOR(S) | | A)<br>B)<br>C) | 34<br>35<br>35 | 34<br>34 | 34<br>34 | 35<br>35 |
| 4210 | AUTHORIZED PROJECT ID(S) | | A)<br>B)<br>C) | 1234<br>1234<br>1235 | 1234<br>1234 | 1234<br>1234 | 1234<br>1235 |
| 4216 | TIME STAMP(S) | 4238 ALLOW POWER UP | HOURS (0-23) | 08 | 08 | 08 | 08 |
| | | 4240 | MINUTES (0-59) | 00 | 00 | 00 | 00 |
| | | 4242 | DOM (1-31) | * | * | * | * |
| | | 4244 | MONTH (1-12) | * | * | * | * |
| | | 4246 | DOW (0-6) | 1-5 | 1-5 | 1-5 | 1-5 |
| | | 4248 | COMMAND (0-59) | 30 | 30 | 30 | 30 |
| | POWER DOWN | 4250 | HOURS (0-23) | 17 | 17 | 17 | 17 |
| | | 4252 | MINUTES (0-59) | 00 | 00 | 00 | 00 |
| | | 4254 | DOM (1-31) | * | * | * | * |
| | | 4256 | MONTH (1-12) | * | * | * | * |
| | | 4258 | DOW (0-6) | 1-5 | 1-5 | 1-5 | 1-5 |
| | | 4260 | COMMAND (0-59) | 31 | 31 | 31 | 31 |
| | ABSOLUTE LOCK | 4262 | HOURS (0-23) | 00 | 00 | 00 | 00 |
| | | 4264 | MINUTES (0-59) | 00 | 00 | 00 | 00 |
| | | 4266 | DOM (1-31) | 04 | 04 | 04 | 04 |
| | | 4268 | MONTH (1-12) | 07 | 07 | 07 | 07 |
| | | 4270 | DOW (0-6) | * | * | * | * |
| | | 4272 | COMMAND (0-59) | 32 | 32 | 32 | 32 |
| 4220 | TOTAL LIFETIME DEVICE USES | | | XXXXX | XXXXX | XXXXX | XXXXX |
| 4214 | TOTAL AUTHORIZED USES COUNT | | A)<br>B) | 05<br>25 | 09<br>09 | 05<br>09 | 25 |
| 4222 | ACTUAL AUTHORIZED USES | | A)<br>B) | 03<br>25 | 04 | 02<br>09 | 25 |
| 4224 | TOTAL REMAINING USES COUNT | | A)<br>B) | 02<br>00 | 05 | 03<br>00 | 00 |
| 4226 | AUDIT ALGORITHM CALLS TO OPCODE LOCATION IN ACTION PROGRAM TABLE | | DEVICE/USER AUDIT OPCODE<br>DEVICE/SITE AUDIT OPCODE<br>DEVICE/PROJECT AUDIT OPCODE<br>USER-DEFINED AUDIT OPCODE | 12<br>13<br>14<br>15 | 12<br>13<br>14<br>15 | 12<br>13<br>14<br>15 | 12<br>13<br>14<br>15 |
| 4228 | WRITE PROTECT STATUS (1=ON, 0=OFF) | | | 1 | 1 | 0 | 0 |
| 4230 | SPECIAL | | SET COMBINATION COUNT LIMITS<br>SET OTHER AUTHORITIES | XXXXX<br>XXXXX | | XXXXX<br>XXXXX | XXXXX<br>XXXXX |

FIG. 3

ACTION PROGRAM TABLE

| OPCODE | A FIELD | B FIELD | CONSTRUCT DESCRIPTION |
|---|---|---|---|
| 01 | CALL DPVA | | DEVICE PASSWORD VALIDATION |
| 02 | CALL UPVA | | USER PASSWORD VALIDATION |
| 03 | CALL SPVA | | SITE PASSWORD VALIDATION |
| 04 | CALL PPVA | | PROJECT PASSWORD VALIDATION |
| 05 | CALL UDPVA | | USER-DEFINED PASSWORD VALIDATION |
| 06 | CALL PTAA | | PASSWORD TABLE ACCESS ALGORITHM |
| 07 | CALL TSAA | | TIME-STAMP ACCESS ALGORITHM |
| 08 | | | |
| 09 | | | |
| 10 | | | |
| 11 | CALL DDAA | | DEVICE/DEVICE AUDIT ALGORITHM |
| 12 | CALL DUAA | | DEVICE/USER AUDIT ALGORITHM |
| 13 | CALL DSAA | | DEVICE/SITE AUDIT ALGORITHM |
| 14 | CALL DPAA | | DEVICE PROJECT AUDIT ALGORITHM |
| 15 | CALL UDAA | | USER-DEFINED AUDIT ALGORITHM |
| 16 | CALL TSAA | | TIME STAMP AUDIT ALGORITHM |
| 17 | CALL PPAA | | PHYSICAL POSSESSION AUDIT OPCODE |
| 18 | CALL PTAA | | PASSWORD TABLE ACCESS AUDIT OPCODE |
| 19 | | | |
| 20 | | | |
| 21 | | | |
| 22 | | | |
| 23 | | | |
| 24 | | | |
| 25 | | | |
| 26 | | | |
| 27 | | | |
| 28 | | | |
| 29 | | | |
| 30 | | | ALLOW POWER UP |
| 31 | | | POWER DOWN |
| 32 | | | ABSOLUTE POWER LOCK |
| 33 | XXXX | | TIME DELAY |
| 34 | XXXX | 1011101 | IF |
| 35 | XXXX | LOCATION | JUMP |
| 36 | XXXXXXXX | XXXXXXXX | PUT CUSTOM MESSAGE |
| 37 | X-Y | STRING POINTER | DISPLAY |
| 38 | XXXXXXXX | XXXXXXXX | SEND MESSAGE |
| 39 | | | BEEP |
| 40 | | | FLASH |
| 41 | LENGTH/DEVICE | BUFFER POINTER | INPUT |
| 42 | | | |
| 43 | | | |
| 44 | | | |

OPCODE 41 READS THE TWO BYTE A FIELD, THE FIRST BYTE OF WHICH SAYS TO GET AN INPUT OF LENGTH, THE SECOND BYTE OF WHICH SAYS FROM WHICH DEVICE

FIG. 4

DEVICE CONFIGURATION TABLE

| | | | | | |
|---|---|---|---|---|---|
| 4701— | AUTHORIZED DEVICE ID | | | | |
| | MODULE(S), BASE UNIT(S), AND OTHER COMPUTING DEVICES | 0515 | 0516 | 1711 | 1712 |
| 4703— | DEVICE DEFINITION | 1 | 1 | 0 | 0 |
| | BASE UNIT 0 | | | | |
| | DISK DRIVE 1 | | | | |
| | STREAMING TAPE 2 | | | | |
| | CD-ROM 3 | | | | |
| | MAGNETO-OPTIC 4 | | | | |
| | . | | | | |
| | . | | | | |
| | . | | | | |
| 4705— | SELECT BUS TYPE | 0 | 0 | 0 | 0 |
| | SCSI 0 | | | | |
| | IPI 1 | | | | |
| | SMD 2 | | | | |
| | ST-506 3 | | | | |
| | . | | | | |
| | . | | | | |
| 4707— | SELECT PREFERRED BUS ADDRESS ID | 0 | 0 | 9 | 9 |
| | (FIRST ROW SHOWS PREFERRED, NEXT ROW SHOWS SECOND PREFERENCE, AND SO ON) | 3 | 3 | | |
| 4709— | CALL ALGORITHM FROM ACTION PROGRAM TABLE TO RESOLVE CONFLICTING BUS ADDRESS ID REQUESTS | 24 | 24 | 24 | 24 |
| 4711— | BUFFER WITH RESOLVED BUS ADDRESS ID | 3 | 0 | 7 | 7 |
| 4713— | CALL ALGORITHM FROM ACTION PROGRAM TABLE TO TELL PSEUDO SCSI TARGET TO "GO AWAY" | 25 | 25 | 25 | 25 |
| 4715— | CALL DIAGNOSTICS ALGORITHMS | 50 | 50 | 50 | 50 |

FIG. 5

HISTORY TABLE

| | | | | |
|---|---|---|---|---|
| 4801 — AUDIT ALGORITHM INPUTS | | | | |
| FROM ACTION PROGRAM TABLE | | | | |
|     DEVICE/DEVICE AUDIT OPCODE | 11 | 11 | 11 | 11 |
|     DEVICE/USER AUDIT OPCODE | 12 | 12 | 12 | 12 |
|     DEVICE/SITE AUDIT OPCODE | 13 | 13 | 13 | 13 |
|     DEVICE/PROJECT AUDIT OPCODE | 14 | 14 | 14 | 14 |
|     USER-DEFINED AUDIT OPCODE | 15 | 15 | 15 | 15 |
|     TIME STAMP AUDIT OPCODE | 16 | 16 | 16 | 16 |
|     PHYSICAL POSSESSION AUDIT OPCODE | 17 | 17 | 17 | 17 |
|     PASSWORD TABLE AUDIT OPCODE | 18 | 18 | 18 | 18 |
|     DEVICE USE COUNT AUDIT OPCODE | 19 | 19 | 19 | 19 |
| 4803 — RESULTING AUDIT DATA | | | | |
|     DEVICE/DEVICE AUDIT RESULT | XXXXXX | XXXXXX | XXXXXX | XXXXXX |
|     DEVICE/USER AUDIT RESULT | XXXXXX | XXXXXX | XXXXXX | XXXXXX |
|     DEVICE/SITE AUDIT RESULT | XXXXXX | XXXXXX | XXXXXX | XXXXXX |
|     DEVICE/PROJECT AUDIT RESULT | XXXXXX | XXXXXX | XXXXXX | XXXXXX |
|     TIME STAMP AUDIT RESULT | XXXXXX | XXXXXX | XXXXXX | XXXXXX |
|     PHYSICAL POSSESSION AUDIT RESULT | XXXXXX | XXXXXX | XXXXXX | XXXXXX |
|     PASSWORD TABLE AUDIT RESULT | XXXXXX | XXXXXX | XXXXXX | XXXXXX |
|     DEVICE USE COUNT AUDIT RESULT | XXXXXX | XXXXXX | XXXXXX | XXXXXX |
| 4804 — DIAGNOSTICS HISTORY | | | | |
|     DEVICE | | | | |
|     POWER SUPPLY | | | | |
|     MICROPROCESSOR | | | | |
|     REAL TIME CLOCK | | | | |
|     NON-VOLATILE MEMORY | | | | |
|     VOLITLE MEMORY | | | | |
|     SHOCK ENVIRONMENT | | | | |
|     TEMPERATURE ENVIRONMENT | | | | |
|     . | | | | |
|     . | | | | |
|     . | | | | |
| 4805 — SPECIAL | | | | |
|     SET SPECIAL USER ID COUNT LIMITS | XXXXX | XXXXX | XXXXX | XXXXX |
|     SET OTHER SPECIAL AUTHORITIES | XXXXX | XXXXX | XXXXX | XXXXX |

FIG. 6

ENHANCED SECURITY SYSTEM FOR COMPUTING DEVICES

This is a continuation of application Ser. No. 07/763,915 filed on, Sep. 23, 1991 now abandoned.

BACKGROUND OF THE INVENTION

1. Field of the Invention

This invention relates to security systems for computing devices, and more particularly to security systems which utilize microprocessor control, non-volatile memory and a real-time clock to selectively control access to, and record usage of, fixed and/or removable computing devices such as data storage devices, CPUs, memory units, base units, microprocessors, peripheral boards, power supplies, and/or input/output controllers.

2. Description of Related Art

Presently-existing computer systems generally provide no means for electronically controlling access to computing devices. Furthermore, these systems do not provide any indication or history of power-on, data access, execution, or data modification operations. Accordingly, access control has been implemented by controlling physical access to the computing device itself, or by physically controlling access to the power switch of a computing device.

Another method of providing physical access control involves the use of data storage devices having removable memory units. In the early history of computing devices, magnetic disk drives having removable magnetic platters were commonly used as data storage mechanisms. This configuration of equipment permitted the use of a number of sets of platters with one drive unit, resulting in substantial economies since much of the cost of such a disk drive unit was in the motor drive unit, read/write head structure, and control electronics. This system provided a measure of physical security, in that the platters could be removed and stored in a secure location.

Many present-day disk drives are manufactured as sealed units, with nonremovable magnetic platters. The use of sealed disk drive units permits the drives to be fabricated in an efficient, cost-effective manner. However, a disadvantage of sealed disk drives has been that they are normally not designed to be easily removed from a computer system. Such removability is desirable for a number of reasons, including ready replacement of defective drives and transportation of data from one computer system to another. However, probably the most important reason for such removability is for purposes of security, to permit removal of drives containing sensitive data. In some cases, data may be so sensitive that a removed drive must be stored in a vault when not in use.

With the advent of small format disk drives (e.g., commonly available 5¼" and 3½" form factor drives, as well as 2½" and 1.8" drives), removable disk drives have been introduced. Some of these products include a "docking base" coupled to a computer system and having a power supply and computer interface, with the disk drive itself being removable from the docking base. In other products, the disk drive, power supply, and computer interface form a removable unit, although the computer system may have a "docking interface" for making electrical connections to the removable unit. Oftentimes, computing devices are arranged to form a network. These devices are relatively easy to access. After the computer device is powered up, the data stored in these devices are generally not secured.

U.S. Pat. No. 4,591,975, issued to Wade, et al. on May 27, 1986, and entitled "Data Processing System Having Dual Processors," discloses removable disk drives which incorporate security features into the drive design to protect the stored data from unauthorized access or modifications. The disclosure of Wade, et al. is incorporated herein by reference. The unit described in Wade has a lockable hardware write-protection feature in addition to a locking switch mechanism for controlling the write-protection feature.

Removable data storage systems incorporating these features allow users to lock each module into a base unit, to lock a module in powered-down mode, or to lock a module into read-only or write-protect mode. Further, a module can be shipped or given to a colleague or security officer, key-locked in full access, write-protect, or no-access modes. Thus, security may be provided at the physical level, and/or at an electronic level.

It is possible to design a security system which controls access to computing devices, such as data storage devices, CPUs, memory units, microprocessors, peripheral boards, power supplies, and/or input/output controllers. In this manner, versatility and flexibility of the security system is enhanced. Building upon the security feature advantages taught previously by Wade, et al. and addressing the continuing disadvantage of present security systems for computing devices, several novel enhancements and further improvements in computing system security are taught herein.

SUMMARY OF THE INVENTION

The present invention relates to a method and an apparatus which is utilized in conjunction with a computing device to provide system security. The invention utilizes microprocessor control, non-volatile memory, and a real-time clock to selectively control access to, and record usage, of fixed and/or removable computing devices such as data storage devices, CPUs, memory units, microprocessors, peripheral boards, power supplies, and/or input/output controllers. An optional user input may be provided to selectively program access to one or more computing devices. An optional keypad input and display may also be provided. A preferred embodiment of the security system employs a plurality of tables, including an options table, a password table, an authorities table, an action program table, a device configuration table, and a history table. The security system operates by controlling electronic access to one or more computing devices. In addition to providing programmable, selective device and/or data access control, the system keeps user-definable records setting forth the usage history of the computing device.

The principles set forth herein apply to computing devices, which may be removable or non-removable, including fixed or removable data storage devices, such as disk drives, tape drives and floppy drives. The term "computing devices" as employed herein is also used to refer to CPU, memory units, microprocessors, peripheral boards, power supplies, and/or input/output controllers. More specifically, the invention may be connected in series with the power supply leads of a microprocessor or electronic circuit board or data storage device to provide selective programmable access to the microprocessor. The invention is capable of controlling access to computing devices requiring higher than milliamp-level currents by means of switching relays.

The options table consists of a list of system parameters which may be set by a security officer to meet the requirements of specific applications. The system parameters include identification of authorized users and authorized devices, the maximum number of concurrent users, the maximum term of office for individual security officers, a reauthorization time delay for security officers (super users), privilege level specification for security officers and/or super users, the types of data which will be displayed on the :module, the types of data which will be accepted from external devices, and/or the data which may be transmitted over the serial port. Additionally, the system parameters may specify the type of information which may be displayed from the options table, the password table, the authorities table, the action program table, and the history table. The system parameters may also specify bit usages, permit communication over the serial port only, and/or permit communication only with a printer. The system parameters may specify the external device or devices which will be used to update the computing device.

The password table includes a list of authorized system users and projects. This table determines which individuals and projects will have access to a given computing device at a given point in time. Upon requesting power-up of a computing device, the password table may be queried to determine whether particular individuals or projects should be granted access to a given computing device at the time the access is attempted. Thus, the password table controls "log-on" validation at the user level. The information stored in the password tables of two respective computing devices is compared to determine whether any further data transfer between the two devices will be permitted. Alternatively, the information stored in the password table of one computing device may be compared with information entered into the computing device by a potential system user, to determine whether access will be allowed.

The authorities table provides a list of actions to be taken based upon specific predetermined conditions. This table may be used to provide access to specific portions of a data storage device at a specific point in time. The authorities table is employed in conjunction with user-defined authorities algorithms to implement various validation functions. These functions include verification of the type of device which is connected to a data communications port, determining whether a valid user is logged onto the system, and determining whether a correct project number was presented.

The action program table implements an interpretive data processing function. The table includes information on how to accomplish the items set forth in the authorities table. In the action program table, the system administrator specifies the steps or actions to be taken based upon certain events or combinations of events. For example, the action program table specifies the authorities algorithms to be executed upon the occurrence of a predetermined set of conditions. The table stores information which is accessed at the appropriate time to provide desired control signals to various computing devices within the purview of the security system. In this manner, the action program table is preprogrammed as desired to meet individual system requirements.

The device configuration table specifies a unique device identification number in non-volatile memory thereby enabling a computing device to identify itself when queried by other computing devices. The device configuration table also sets forth the I/O buses and additional computing devices which may be used in conjunction with a given computing device.

The system administrator may input preference data into the device configuration table to specify a preferential order among devices accessing the system I/O bus. These preferences are set forth by means of bus address ID numbers, and are entered into a preferences sub-table, which is part of the device configuration table. The preference sub-table lists device preferences in decreasing order. The preference table makes a call to the appropriate opcode in the action program table which contains an algorithm to resolve conflicting bus address ID requests. Upon completion of the algorithm, the device configuration table is updated with the resolved bus address ID number.

Additionally, the device configuration table provides a means of controlling the servicing of a base unit or module upon device failure. This servicing can include, communicating with, uploading memory and downloading memory, including the table information. Specification of a pseudo bus target inside a typical base unit allows the uploading and downloading of table data over the bus protocol. The last command given to the action program table may be for the pseudo device to "go away" to allow another device to take its place on the bus, functioning from the system host adapter.

The history table provides an audit trail setting forth the access and usage history of the computing device. In addition to providing programmable, selective device and/or data access control, the system keeps user-definable records setting forth the usage history of the data storage device. The usage history includes a log of all individuals who accessed, or attempted to access, the computing device, the times at which the access was completed or attempted, the purpose of accessing the device, the project for which the device was accessed, the total count of the number of insertions/successful power-ups of a particular computing device, and/or the block of data which was accessed.

In all of the above-specified tables, a user-definable set of columns are reserved to provide additional flexibility in custom-tailoring the security systems' features to a particular application or circumstance. Special ordering of the tables is accomplished in the option table. In essence, the table portion of the invention includes a programming language to enable system administrators or security officers to write or specify their own implementation as desired.

The present invention may be employed in conjunction with a docking base and a removable data storage module having a lockable hardware write-protection feature. A power supply and a computer interface are situated within the docking base. Alternatively, the power supply may be situated within the removable module, or may be positioned external to the docking base and removable module. The docking base may be configured to receive one or more removable modules, and dimensioned to fit removable modules of various sizes.

The docking base unit contains (1) a microprocessor, (2) non-volatile memory, (3) a real-time clock, (4) a display which can selectively show any or all of the table data as specified by the security officer or system administrator, (5) electronic power control circuitry, except when used in conjunction with removable data storage modules, (6) a tamper-resistant lock or data key receptacle (7) an optional electrical connection interface designed to reduce or eliminate radio frequency interference (RFI) and electro-magnetic interference (EMI), (8) a unique removal mechanism that provides for orderly powering down of a data storage module before removal of the module from a docking base, (9) a unique module latching and tamper-resistant lock mechanism that provides for positive lockable securement of the module into the docking base, and (10) an optional keypad. The base units may be configured as a data processing network. The features of the base unit may be implemented by means of a CPU to control access to remote or fixed data storage devices or other computing devices. These systems may use either encrypted or unencrypted data transfer schemes. An optional electronic encryption circuit in the docking base ensures that all data written on the data storage device can only be deciphered when that removable module is used in a base unit. RAID controllers may also be employed, especially where the modules are removable.

The removable data storage module contains (1) a microprocessor, (2) nonvolatile memory, (3) a real-time clock, (4) a display which can selectively show any or all of the table data as specified by the security officer or system administrator, (5) electronic power control circuitry, (6) a tamper-resistant lock or data key receptacle . . . , (7) an optional electrical connection interface designed to reduce or eliminate radio frequency interference (RFI) and electro-magnetic interference (EMI) (8) a unique removal mechanism that provides for orderly powering down of a data storage module before removal of the module from a docking base and (9) a unique module latching and tamper-resistant lock mechanism that provides for positive lockable securement of the module into the docking base, and (10) an optional keypad. The concept can be extended to include Tempest data processing systems, wherein modules can be plugged in to implement the NACSIM 5100A (TEMPEST) standard. These modules contain microprocessors and non-volatile memory. A real-time clock can be added to the module to provide additional security, a sensor array can also be added to either the base unit data storage module to provide the capability of sensing, communicating with the microcontroller, and history tables optionally near real time or historical environmental history of the base unit or module In the present embodiment, items (1)–(5) of the preceding paragraphs may be configured on a PC (printed circuit) board. In this manner, the PC board is mounted in the data storage module or computing device. Additionally, the PC board can be flexibly utilized when mounted in alternate configurations of computing devices, including, but not limited to fixed or removable data storage devices, modules, base units, CPUs, etc. It is envisioned that a further implementation of the invention includes embedding the above-listed circuitry and components directly into the controller board of a data storage device. In this manner, a new generation of data storage devices can be developed and made available with the ability to configure their SCSI target IDs, based upon using the device configurations table, to selectively control access.

The removable modules may be dimensioned to fit data storage devices of various sizes and in various form factors, including but not limited to, 3½", 5¼" half-high 5¼" full-high, and other types of data storage devices.

The invention permits complete removal of a data storage module from its docking base for security purposes, data transport, and replacement. The inventive removable module can be securely locked into a docking base, as well as locked into a write-protect mode or read-write mode such that the mode cannot be changed without a key or combination to the lock. The ability to lock the removable module into a write-protect mode provides data security when the data storage module is in use, without concern for accidental or negligent alteration or erasure of data. Further, the removable module can be securely locked into a docking base in an inoperative mode, so that the data cannot be read and the removable module cannot be removed. In addition, the removable module can be securely locked out of a docking base, so that the disk drive cannot even be read, thus providing an added measure of data security.

In addition to a docking base and a number of data storage units, the invention can optionally employ a key management system and a data control system having data backup/recording/archival backup capabilities. The data control system has the innovative capability of providing programmable selective data access control. The data control system also monitors data access in process, and records data access history. These and other novel features which provide this capability allow system administrators, security officers, and specific users to select, monitor, and record important information on which individuals accessed which data, when the data was accessed, where (i.e., in what base unit), how, how many times, and why any particular element of a removable storage system was used.

Further aspects of the present invention will become apparent from the following detailed description when considered in conjunction with the accompanying drawings. It should be understood, however, that the detailed description and the specific examples, while representing the preferred embodiment and several alternative embodiments of the invention, are given by way of illustration only.

BRIEF DESCRIPTION OF THE DRAWINGS

FIG. 1 illustrates the data structure of the options table which is used to implement the present invention.

FIG. 2 illustrates the data structure of the password table which is used to implement the present invention.

FIG. 3 illustrates the data structure of the authorities table which is used to implement the present invention.

FIG. 4 illustrates the data structure of the action program table which is used to implement the present invention.

FIG. 5 illustrates the data structure of the device configurations table which is used to implement the present invention.

FIG. 6 illustrates the data structure of the history table which is used to implement the present invention.

Like reference numbers in the various drawings refer to like elements.

DETAILED DESCRIPTION OF THE INVENTION

Figure 7:
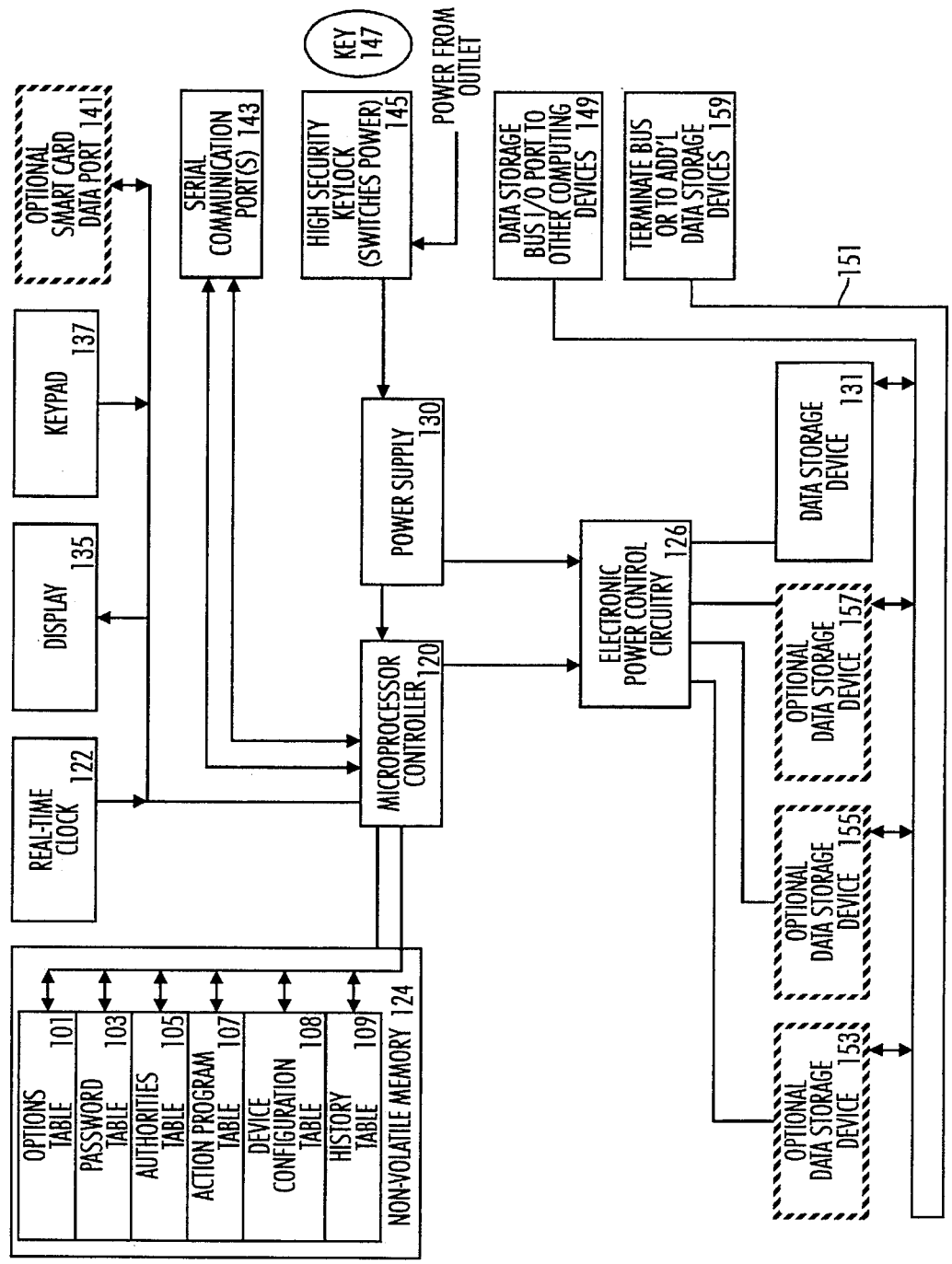
FIG. 7 is a block diagram illustrating the security system of the present invention employed in the context of a fixed data storage device.

The following description is of the best presently contemplated modes of carrying out the invention. This description is made for the purpose of illustrating the general principles of the invention and should not be taken in a limiting sense.

The security system of the present invention controls access to one or more computing devices by utilizing information tables. If the system is employed in the context of a removable data storage unit and a fixed base unit, the information tables are stored within non-volatile memory banks maintained by each individual unit. Access to both the removable data storage unit and the fixed base unit is controlled by cross-validating the information stored in the respective non-volatile memory banks. The system also determines SCSI target ID, and can be used to optionally set write-protect Access to computing devices is controlled on two primary levels: first by devices (such as docking base units, and removable storage modules, fixed disk drives, microprocessors, etc.), and then by individual users, or groups of users. The computing devices are initialized by system administrators, security officers, and others with special privilege access. For instance, a data security officer (or end user, if privileges are allowed) can selectively program various permutations and combinations of user and device accesses to meet the security needs of each site. Access can be programmed to be as simple as "let any person use this base or module at any time for any reason", or as restrictive as allow user ID #02 five accesses to module #0515 on docking base #1711 between 8 a.m. and 5 p.m. on Mondays, through Fridays on site #34 for project #1234. In addition to this example, user access can be further limited to specific days of the week or month in addition to a number of other user-definable restrictions.

Access control at the user level may be implemented by requiring each authorized user to correctly enter their unique user ID and password. Alternatively, the user ID and password may be electronically Stored in the user's computing device and compared with the user ID and password stored within the computing device the user would like to access. A "project" level access log-in procedure can be specified as a substitute for, or in addition to, the user level log-on procedure.

On the device level, each computing device contains access information stored in non-volatile memory that control and report on user and project level access. Although the data and programs stored in non-volatile memory could be fully functional without using tables, for convenience, it is desirable to partition memory and maintain tables. Six types of information tables are maintained: (1) an options table, (2) a password table, (3) an authorities table, (4) an action program table, (5) a device configuration table, and (6) a history table.

The options table (FIG. 1) consists of a list of system parameters which may be set by a security officer to meet the requirements of specific applications. The system parameters include identification of authorized users, the maximum number of concurrent users, the maximum term of office for individual security officers, the types of data which will be displayed on the module, the types of data which will be accepted from external devices, and/or the data which may be transmitted over the serial port. Additionally, the system parameters may specify the type of information which may be displayed from the options table, the password table (FIG. 2), the authorities table (FIG. 3), the action program table (FIG. 4), the device configuration table (FIG. 5), and the history table (FIG. 6). The system parameters may also specify bit usages, permit communication over the serial port only, and/or permit communication only with a printer. The system parameters may specify the external device or devices which will be used to update a specific computing device.

The table consists of a variable number of rows of the following fields: authorized device ID 4008, authorized users 4010, super user 4012, display 4014, input/output 4016, and special 4018. The authorized device ID field 4008 specifies various computing devices, such as base units and/or modules. The authorized users field 4010 is subdivided into number of concurrent authoritative access 4019, and action program 4020 sub-fields. The super user field 4012 is subdivided into super user term of office 4022, reauthorization time delay 4023, and super user privilege level 4025.

The number of concurrent authoritative access 4019 sub-field sets forth the maximum number of users which will be allowed to access a given computing device at a given moment in time. The action program 4020 sub-field specifies the validation programs to be executed for specific users who attempt to access the computing device. The super user term of office 4022 sub-field represents the total length of time for which a given security officer and/or super user will be permitted to perform at a specified post. The reauthorization time delay 4023 represents the hours for which a given security officer will be delayed from resuming supervisor status, which allows a hierarchy of supervisors to be established. The super user privilege level 4025 enables optional hierarchical levels of supervisors and/or super users to be specified.

The display field 4014 designates the tables which specific security officers and/or super users will be allowed to display. In this example, each entry of the display 4014 field contains six digits. Each digit represents a particular table, such as the options table, the authorities table (FIG. 2), the action table (FIG. 3), the password table (FIG. 4), the device configuration table (FIG. 5), or the history table (FIG. 6). A zero in the display 4014 field (FIG. 1) indicates that the display of a table will be denied, whereas a one indicates that the display of the table will be allowed.

The input/output 4016 field specifies the port or ports on the computing device which are allowed to carry I/O communication, and the additional computing devices from which input may be received or to which output may be sent. The devices specified in this field are computing devices such as data storage devices, CPUs, memory units, microprocessors, peripheral boards, power supplies, and/or input/output controllers.

The password table (FIG. 2) controls "log-on" validation at the user and project level. The password table allows the security officer (super user) the option of setting up the sequence in which various successful password query routine operations must be performed. For instance, device, user, site, project, and other parameters can optionally be specified for which a valid password must either be input, be resident, or not be required to be input. The password table performs a log-on function, which must be successfully completed prior to requesting access to any computing device. The table consists of a variable number of rows of the following data fields:

authorized device ID (4150): identification code for each user or project to be granted access.

authorized user ID (4152): string of characters that must reside correctly on both the module and the corresponding base to gain access.

authorized site ID (4154): numeric code specifying a particular site location, and implementing the election of a validation algorithm which must be successfully executed by the module/base resident microprocessor before allowing access.

authorized project ID (4156): numeric code specifying specific projects for which access will be allowed and/or denied.

special passwords ID (4158): user-defined numerical code.

special password table access audit identifier (4160): arbitrary user-defined string that is passed through to each history table entry to assist in site security audit applications.

A log-in attempts field 4162 may be incorporated into the history table (FIG. 6) or the password table (FIG. 2). For a given computing device, this field stores the number of times a log-in operation was attempted, irrespective of whether or not the log-in was actually successful. This field also includes an integer value representing the maximum number of log-in attempts which will be allowed before the computing device ignores further attempts at log-ins. If the maximum number of log-ins is exceeded, a security officer is required to re-set the computing device to place the device back into service.

The log-in attempts field contains a sub-field which stores all actual passwords inputted to a computing device, regardless of whether or not log-in was successful, and regardless of whether or not the password was valid. Thus, surreptitious access attempts can be traced for future reference. An authorized date field 4164, and/or an authorized time field 4166, may be incorporated into the password table.

The authorities table (FIG. 3) includes a list of authorized users and associated data block, time and/or location constraints. The authorities table controls access to specific computing devices following successfully logging on using the Password Table described immediately above (FIG. 2). Authorities algorithms are user-defined and can call a main Supervision Routine that will call various Validation Functions. For instance, Validation Function 1 could query whether a Smart Base is present (i.e. a computing device which contains a microprocessor), VF2 could query whether a valid user is logged on, VF3 could query whether the correct project number is entered, etc. This powerful feature will allow security officers to customize their local site security in a manner that best fits their security requirements. It is highly desirable for the security officer to be able to conveniently set up the authorities table, so keyboard input protocol will recognize the ASCII# as a signal to obtain data from the keyboard. The table consists of N rows of the following data fields:

authorized device ID (4201): serial number of a computing device.

authorized user ID (4203): string of characters that must be resident in the user's mating computing device and/or entered correctly by the user to allow powering up a desired resident computing device; identifying code of authorized user.

site validator (4206): numeric code designating a site specific validation algorithm to be successfully executed by the resident computing device microprocessor before allowing access.

authorized project ID (4210): identifying code of the authorized project. uses count authorized device mate ID matrix (4212): serial number of the mating computing device authorized for use in conjunction with the resident computing device.

total authorized uses count (4214): the total number of authorized access operations permitted.

time stamp (4216): numeric coding for day of the month/hour/minute/that indicates the allowable access times during which the computing device may be used. Appropriate action table command may be invoked.

total lifetime device uses (4220): the total number of access operations attempted for a given computing device.

actual authorized uses (4222): the actual number of authorized access operations successfully conducted.

total remaining uses count (4224): the number of remaining access operations which will be allowed.

audit algorithm calls to opcode location in action program table (4226): specify operational codes which call audit algorithms in the action program table (FIG. 4).

write-protect status (4228): a bit which indicates whether or not write protection has been activated.

special (4230): arbitrary user-defined strings which may be passed through the history table to assist in site security audit applications.

The time stamp field (4216) is divided into the following sub-fields (FIG. 3):

The Hours, Minutes, Day of Month, Month, and Day of Week sub-fields (4238, 4240, 4242, 4244, 4246, 4248) specify the time or times at which power-up will be allowed, and/or given commands will be executed. In a similar fashion, sub-fields 4250, 4252, 4254, 4256, 4258, and 4260 specify power-down times, and sub-fields 4262, 4264, 4266, 4268, 4270, and 4272 specify absolute lock (shut-down access denied) times. Asterisks are used to denote activities which are executed independent of the time unit in question. For example, at 1700 hours, the system is powered down, but only on the first through the fifth days of the week. Since this activity may theoretically occur on any date of any month, the fields "day of month" and "month" contain asterisks.

The authorized device ID field 4201 specifies those device ids allowed access. The concurrent authoritative access field sets forth the maximum number of users which will be allowed to access a given computing device at a given moment in time. The action program field specifies the validation programs to be executed for specific users who attempt to access the computing device.

An optional physical possession field may be employed to allow the security officer to monitor the possession history of a computing device. This field would contain the user identification numbers of all individuals who were in possession of the computing device. In this manner, a continuous possession history is established for future reference. A message might be displayed that a particular module is not authorized to interface with a particular base unit, if the authorized device mate, ID matrix fields 4212 if the respective devices do not match.

A somewhat simplified, but secure, log-on procedure would entail using just the first two sub-tables of the authorities table and the action program table, where the various modules, base units, etc. will be queried and determination will be made of whether authorized interoperability is permitted. See Authorities Table, FIG. 4.

The action program table (FIG. 4) implements an interpretive data processing function. The table includes information on how to accomplish the items set forth in the authorities table (FIG. 3). In the action program table (FIG. 4), the system administrator specifies the steps or actions to be taken based upon certain events or combinations of events. For example, the action program table specifies the authorities algorithms to be executed upon the occurrence of a predetermined set of conditions. The table stores information which is accessed at the appropriate time to provide desired control signals to various computing devices within the purview of the security system. In this manner, the action program table is preprogrammed as desired to meet individual system requirements.

The action program table includes the following data fields: An operations code field 4401, an A field 4403, a B field 4405, and a description field 4407.

Each horizontal row of the table represents a construct, which consists of an operations code field 4401, an A field 4403, and a B field 4405. The A and B fields 4403, 4405 are user-definable; however, in this example, each opcode in the operations code field 4401 specifies a condition in the A field 4403 and the location of an instruction in the B field to be executed upon the occurrence of the condition. A description field 4407 sets forth a brief description of the instruction which will be executed. For example, opcode 7 will cause the execution of a time-stamp access algorithm.

Standard available microprocessors contain embedded programmable steps or instructions which will be "called" from the action program table as necessary. Custom steps or instructions are defined using the action program table.

FIG. 5 shows the device configuration table. The device configuration table specifies a unique device identification number in non-volatile memory, thereby enabling a computing device to identify itself when queried by other computing devices. The device configuration table also sets forth the I/O buses and additional computing devices which may be used in conjunction with a given computing device.

The system administrator may input preference data into the device configuration table to specify a preferential order among devices accessing the system I/O bus. These preferences are set forth by means of bus address ID numbers, and are entered into a preferences sub-table, which is part of the device configuration table. The preference sub-table lists device preferences in decreasing order. The preference table makes a call to the appropriate opcode in the action program table which contains an algorithm to resolve conflicting bus address ID requests. Upon completion of the algorithm, the device configuration table is updated with the resolved bus address ID number.

Additionally, the device configuration table provides a means of controlling the servicing of a base unit or module upon device failure. This servicing can include communicating with, uploading memory and downloading memory, including the table information. Specification of a pseudo bus target inside a typical base unit allows the uploading and downloading of table data over the bus protocol. The last command given to the action program table is for the pseudo device to "go away" to allow another device to take its place on the bus, functioning from the system host adapter.

The device configuration table contains the following fields:

authorized device ID (4701): device identification numbers corresponding to authorized computing devices.

device definition (4703): specifies the type of computing device for each device set forth in the authorized device ID field. The device types include base units, disk drives, streaming tape, CD-ROM, magneto-optic, and others.

select bus type (4705): specifies the type of bus for each device set forth in the authorized device ID field. Bus types include SCSI, IPI, SMD, and others.

select preferred bus address ID (4707): first row shows preferred bus address, second row shows second preference for bus address, third row shows third preference for bus address, and so on.

call algorithm from action table (4709): calls an algorithm from the action program table to resolve conflicting bus address ID requests.

buffer with resolved bus address ID (4711): contains the resolved bus address determined after execution of the program called in the previous field (4709).

call algorithm from action program table (4713): calls an algorithm from the action program table to remove a pseudo SCSI target from consideration as a valid bus address.

The history table (FIG. 6) contains a transactional log which sets forth the usage history of the computing devices. The history table reports access to specific computing devices by specific users on specific projects. The table consists of N rows of the following data fields:

audit algorithm inputs from action program table (4801): sets forth audit algorithm inputs received from the action program table, including device-to-device, device-to-user, device-to-site, device-to-project, user-defined, time-stamp, physical possession, password table, and device use count audit opcodes.

resulting audit data (4803): specifies audit data for device-to-device, device-to-user, device-to-site, device-to-project, time-stamp, physical possession, password table, and device use count audit results.

special (4805): specifies special user ID count limits, and/or sets other special authorities or audits.

The history table provides an audit trail setting forth the access and usage history of the computing device. In addition to providing programmable, selective device and/or data access control, the system keeps user-definable records setting forth the usage history of the data storage device. The usage history includes a log of all individuals who accessed, or attempted to access, the computing device, the times at which the access was completed or attempted, the purpose of accessing the device, the project for which the device was accessed, the total count of the number of insertions/successful power-ups of a particular computing device.

The usage history includes a log of the device-to-device audit result, all assigned users, sites at which access was completed or attempted, project(s) for which the device was accessed, the times at which the access was completed or attempted, the total count of the number of insertions/ successful power-ups of a particular computing device, and the password access audit result. It also includes a log of special user ID count limits and other special authorities which may be defined and established by the authorized security officer (super user) to allow adaptation to individual user needs and desires.

In all of the above-specified tables, a user-definable set of columns is reserved to provide flexibility in custom-tailoring the security systems' features to a particular application or circumstance.

Although a preferred embodiment of the invention employs six tables (options, password, authorities, action program, device configuration, and history), various alternate embodiments of the invention may be provided to meet specific system requirements or applications. Some of these alternate embodiments involve the use of less than all six of the above-referenced tables, whereas other alternate embodiments may provide for one or more additional tables. For example, a relatively simple system would employ only a history table. In this manner, a record of data access history would be provided. Another example would employ the device use configuration to determine whether use of the device would be allowed. The device configuration table could be employed in conjunction with the history table to implement specific system applications. A system using only a history table and a password table would provide a record of who accessed specific computing devices at specific points in time.

A further embodiment of the security system employs a subroutines table in conjunction with one or more of the aforementioned tables. The subroutines table contains a list of subroutines which are called from another table, such as the action program table. The subroutines table can be configured as a list of C-language calls to various subroutines. Alternatively, the subroutines table could be incorporated into the action program table if desired.

The diagnostics history subfield 4804 of the history table allows the time of occurrence of various diagnostic procedures to be selected by the user. The user may also specify the execution times for repetitive diagnostic procedures which are executed at regular intervals.

FIG. 7 illustrates a block diagram of a preferred embodiment of the invention in the context of a fixed computing device. Referring now to FIG. 7, the invention includes a microprocessor controller 120, non-volatile memory 124, and a real-time clock 122 to selectively control access to, and record usage of, a computing device, such as data storage device 131. The microprocessor controller 120 controls the operation of electronic power control circuitry 126, which selectively connects the power supply 130 to the data storage device 131 power supply input. The invention is capable of controlling access to computing devices requiring higher than milliamp-level currents by equipping the electronic power control circuitry 126 with switching relays and/or high-power, high-current switching transistors. In this manner, a small switching control signal from the microprocessor controller 120 can switch the relatively large current required to power disk drives and/or CPUs.

A preferred embodiment of the security system employs a plurality of tables, including an options table 1 01, a password table 103, an authorities table 105, an actions table 107 (which may also be referred to as the action program table), a device configuration table 108, and a history table 109 (which may also be referred to as the history table). The security system operates by controlling electronic access to one or more computing devices, such as data storage device 131. In addition to providing programmable, selective device and/or data access control, the system keeps user-definable records setting forth the usage history of the computing device, such as the data storage device 131.

The security system includes a display 135, such as an LCD display, an LED display, a cathode-ray tube (CRT), a fluorescent display, or various other types of displays. A keypad 137 is employed to accept user input. Depending upon the specific system requirements, the keypad 137 may be a relatively simple array of several keys, or a complete qwerty keyboard. The display 135 and keypad 137 may optionally be located on or near the computing device (i.e., data storage device 131). Alternatively, the display 135 and the keypad 137 may be located remotely with respect to the computing device by utilizing the network communication capability provided by the invention in the form of the serial communication port 143, the optional smart card data port 141, and/or the data storage bus I/O port 149. In this manner, the display 135 and the keypad 137 may be incorporated into a work station or into a computing system having a full-size qwerty keyboard and graphics display.

The real-time clock 122, display 135, keypad 137, and non-volatile memory 124 interface with the microprocessor controller 120 by means of a data bus 139. An optional smart card data port 141 may be connected to the data bus 139 to permit communication with an external device such as a microprocessor-based data card containing memory (a "smart card"). One or more serial communication ports may be connected directly to the microprocessor controller 120.

The power supply 130 is controlled by a high security keylock 145 and a key 147. Operation of the key 147 in the keylock switches the power supply on or off as desired. The keylock 145 may be a high-security MEDICO™ lock. The keylock 145 switches power from any standard 110 or 220 VAC wall outlet or switches the remote DC output of a commonly available DC power supply.

A data storage bus 151 is connected to the data storage device 131, and possibly to additional optional disk storage devices 153, 155, 157 as well. The data storage bus 1 51 may be accessed via a data storage bus I/O port 149. This I/O port 149 may be connected to other computing devices if desired.

Figure 8:
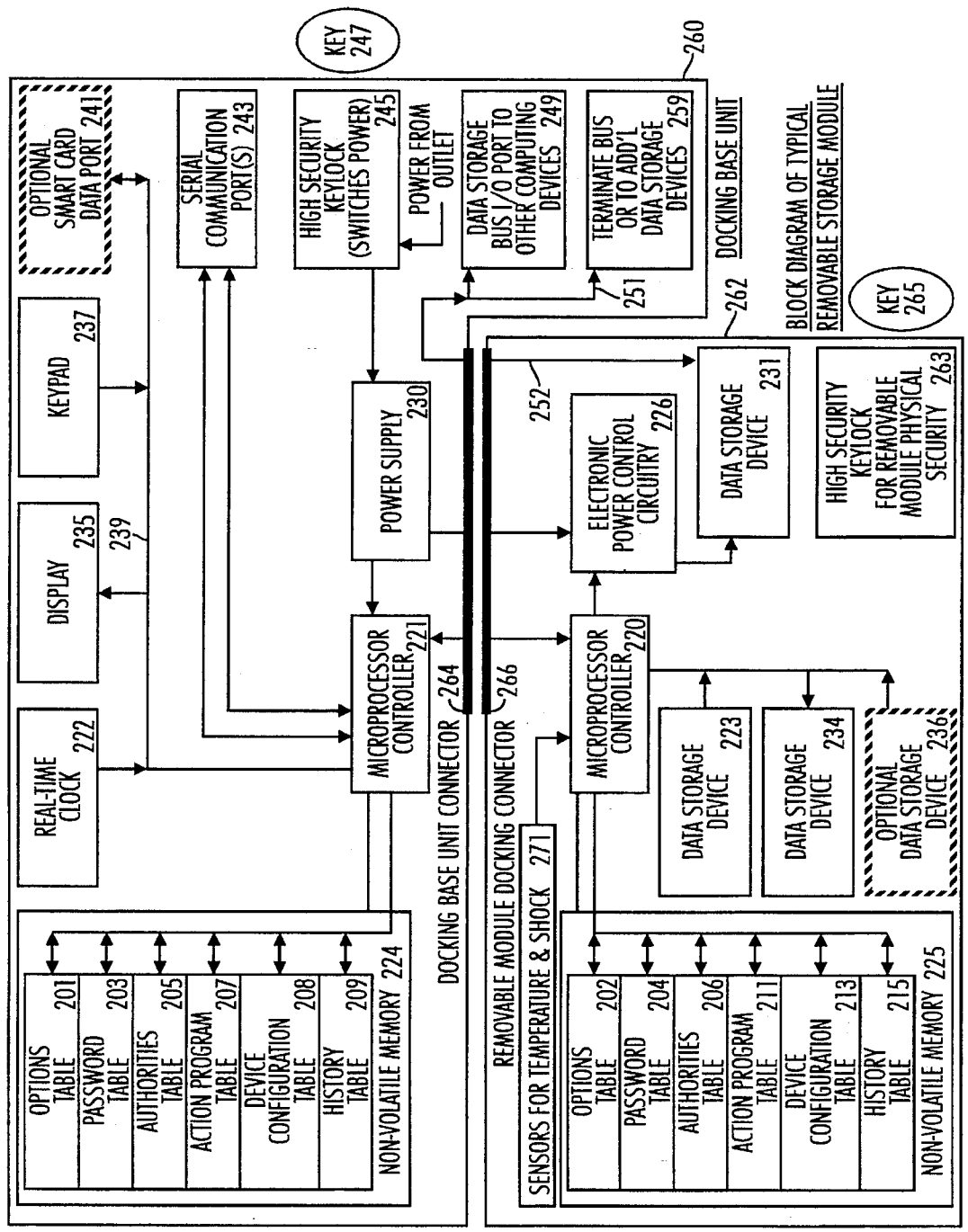
FIG. 8 is a block diagram illustrating the security system of the present invention employed in the context of a removable data storage device.

With reference to FIG. 8, the invention may be employed in the context of a removable computing device, such as a removable data storage module 262. The module 262 interfaces with a docking base unit 260 via a docking base unit connector 264 which mates with a removable module docking connector 266. In this manner, the invention selectively provides power to a computing device such as data storage device 231. The operation of electronic power control circuitry 226 is controlled by a microprocessor controller 220 to selectively provide power from the computing device power supply 230 to the data storage device 231.

The docking base unit 260 and the removable data storage module 262 each contain non-volatile memory 224, 225, respectively. Non-volatile memory 224 is loaded with data, including an options table 201, a password table 203, an authorities table 205, an actions table 207, a device configuration table 208, and a history table 209. In a similar fashion, non-volatile memory 225 is loaded with an options table 202, a password table 204, an authorities table 206, an actions table 211, a device configuration table 213, and a history table 215.

Non-volatile memory 225 is accessed by microprocessor controller 220, and non-volatile memory 224 is accessed by microprocessor controller 221. Microprocessor controller 220 is connected to a real-time clock 223, a display 234, and a keypad 236. Likewise, microprocessor controller 221 is connected to a real-time clock 222, a display, and a keypad 237. However, the keypad 236 on the removable data storage module 262 is optional and need not be provided.

The microprocessor controller 221 of the docking base unit 260 communicates with external computing devices via one or more serial communication ports 243. An optional high-security keylock 245 is operated by a key 247 to switch power from a standard 110 or 220 VAC wall outlet to the power supply 230, or switches the remote DC output of a commonly available DC power supply. A data storage bus 251 may be used to communicate with other computing devices via an I/O port 249. The data storage bus 251 may also connect to additional optional data storage devices 259. The data storage bus 251 interfaces with the data storage device 231 via the docking base unit connector 264, the removable module docking connector 266, and a module data storage bus 252.

The removable data storage module 262 contains a high-security keylock 263 operated by a key 265. The keylock 263 provides physical security for the removable data storage module 262, and does not function in a power-switching capacity. The docking base unit 260 may contain an optional smart card data port 241 for interfacing with microprocessor-based data cards containing memory ("smart cards").

The removable data storage module contains sensors 271 which determine and present the environmental conditions of temperature, and mechanical and/or thermal shock to the microprocessor controller 221. It is envisioned that an integrated circuit with integrated accelerometers, temperature sensing and analog-to-digital converter circuitry will be employed here and mounted onto the circuit board inside a removable data storage module. The device will allow temperature and shock history of a computing device to be determined, which in conjunction with the real-time clock, can accurately pinpoint the occurrence of a particular environmental event. For instance, the system can record that, at 12:30 p.m. on Sep. 20, 1991, device 0515 which was checked out to user#02 received a 20 G, 11 ms shock input while the temperature was 35° C. It is further envisioned that the temperature and shock circuitry would include means for battery backup power to allow power-off monitoring of temperature and/or shock. Battery backup power could also be provided in the actual shipping package to enable shipping environment parameters to be recorded. In this manner, precise information relating to shipping damage can be ascertained.

Figure 9:
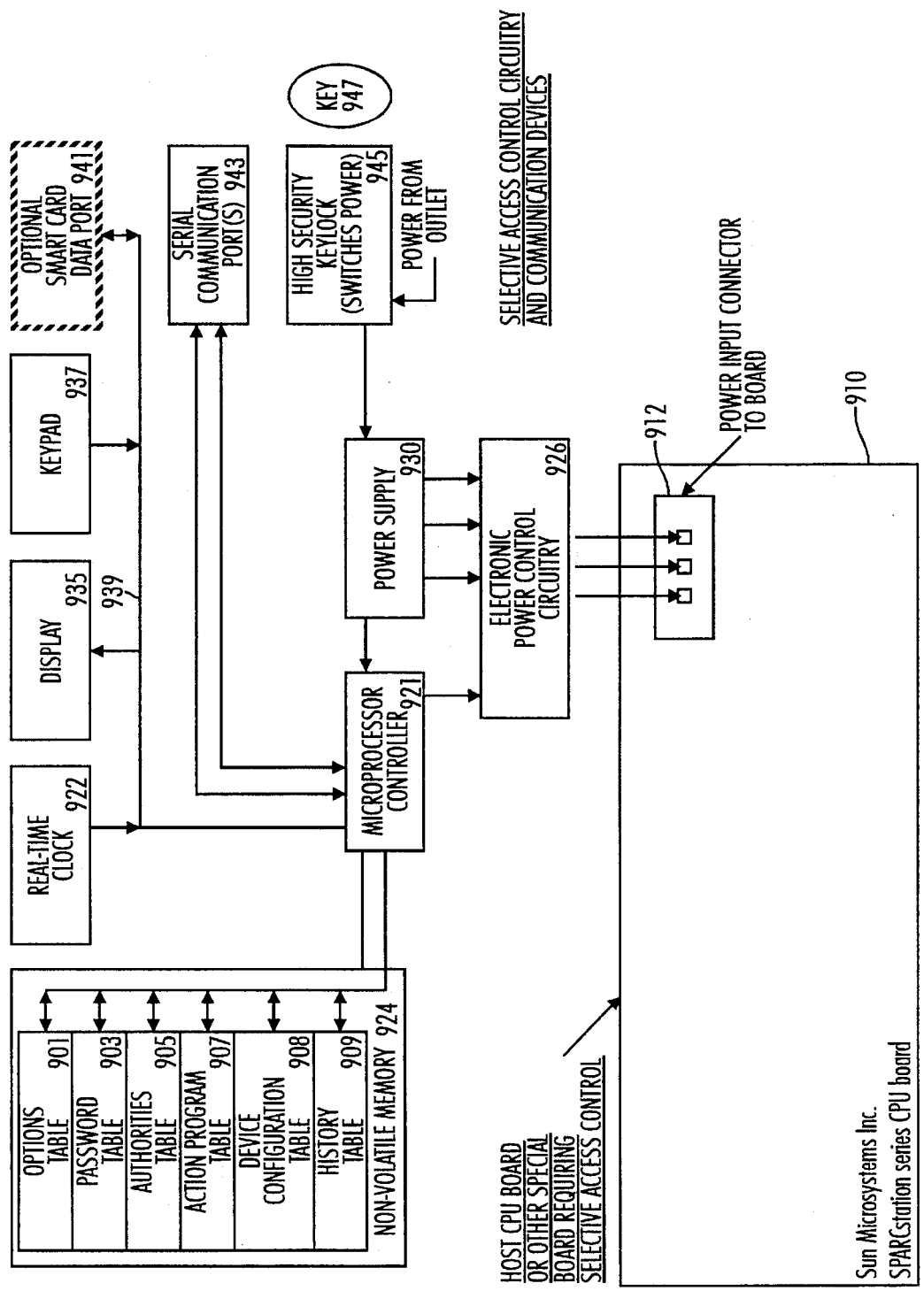
FIG. 9 is a block diagram illustrating the security system of the present invention employed in the context of a central processing unit (CPU).

An alternate embodiment of the invention shown in FIG. 9 controls access to a central processing unit (CPU) or other boards.

FIG. 9 is a block diagram setting forth a preferred embodiment of the invention which provides selective access control to a circuit board. In the illustrated example, the circuit board is a central processing unit (CPU) board 910. The CPU board 910 contains a power input connector 912 which accepts AC or DC input power from an external power source to power up the components on the CPU board 910. The power input connector 912 is connected to electronic power control circuitry 926 which functions as an electronic switch for selectively providing power to the power input connector 912. The electronic power control circuitry 926 selectively switches power from a power supply 930, based upon control signals received from a microprocessor controller 921.

The microprocessor controller 921 addresses data stored within a non-volatile memory 924. The stored data include an options table 901, a password table 903, an authorities table 905, an actions table 907, a device configuration table 908, and a history table 909. A real-time clock 922 provides the microprocessor controller with a time reference. A display 935 outputs information from the microprocessor controller 921 related to the operational status of the security system. A keypad 937 conveys user inputs to the microprocessor controller 921. An optional smart card data port 941 may be employed to permit communication between the microprocessor controller 921 and a microprocessor-based data card containing memory (a "smart card"). One or more serial communication ports 943 permit communication between the microprocessor controller 921 and various external computing devices. A high-security keylock 945 operated by a key 947 may be employed to switch power from a conventional 110 or 220 VAC wall outlet to the power supply 930 or controls the remote DC ON/OFF output port on a power supply. Optionally, the power supply 930 could have a non-lockable on/off feature.

Figure 10:
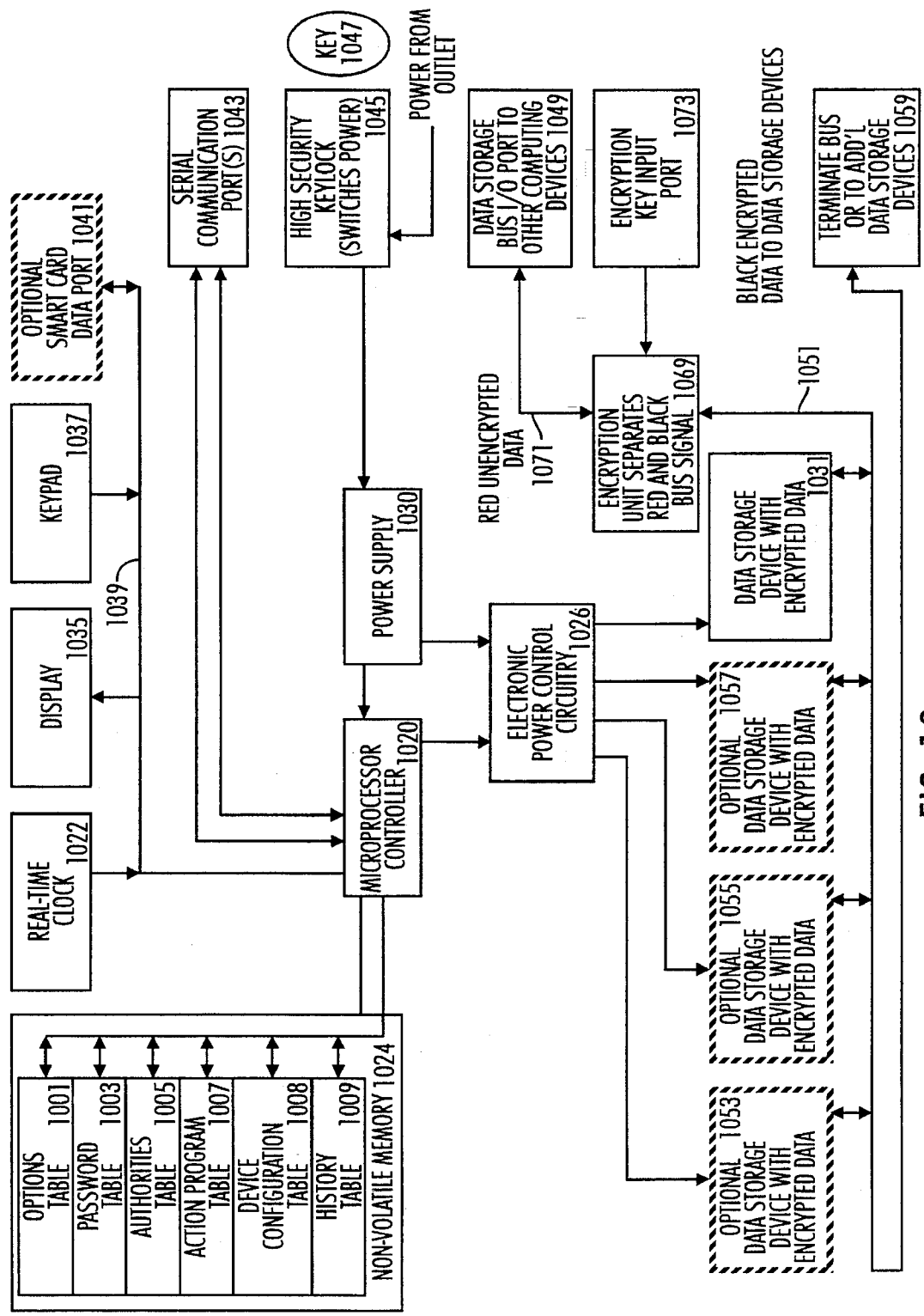
FIG. 10 is a block diagram illustrating a preferred embodiment of the security system of the present invention which employs data encryption.

FIG. 10 illustrates a preferred embodiment of the invention which employs data encryption. The system configuration is very similar to the configurations of FIGS. 7, 8, and 9. Non-volatile memory 1024, a real-time clock 1022, and a microprocessor controller 1020 are utilized. As before, the non-volatile memory 1024 is loaded with an options table 1001, a password table 1003, an authorities table 1005, an actions table 1007, a device configuration table 1008, and a history table 1009. Power supply 1030, display 1035, keypad 1037, optional smart card data port 1041, serial communications port 1043, power supply 1030, high-security keylock 1045, key 1047, electronic power control circuitry, 1026, and data bus 1039 are all configured in a manner identical to that of analogous components in FIGS. 7–9. However, the data storage device 1031 of FIG. 10 contains encrypted data, as do optional data storage devices 1053, 1057, 1066, and 1059. A black encrypted data bus 1051 connects the data storage devices 1031, 1053, 1055, 1057, and 1059 to an encryption unit 1069. The encryption unit 1069 accepts both encrypted data on the black data bus 1051 and unencrypted data via a red data bus 1071. The red data bus 1071 is connected to a data storage bus I/O port 1049, which communicates with external computing devices. The encryption circuit may conform, for example, to the National Data Encryption Standard. Such encryption circuits are well-known, and available commercially on a single integrated circuit. If a removable module data storage device 1301 is stolen, the encrypted data on the enclosed disk drive will still be secure. More secure encryption algorithms such as NSA's Level I algorithm RSA's or the El Gamal algorithm could be implemented. It might also be desirable to utilize data compression in conjunction with encryption to keep the additional required data storage space to a minimum.

Figure 11:
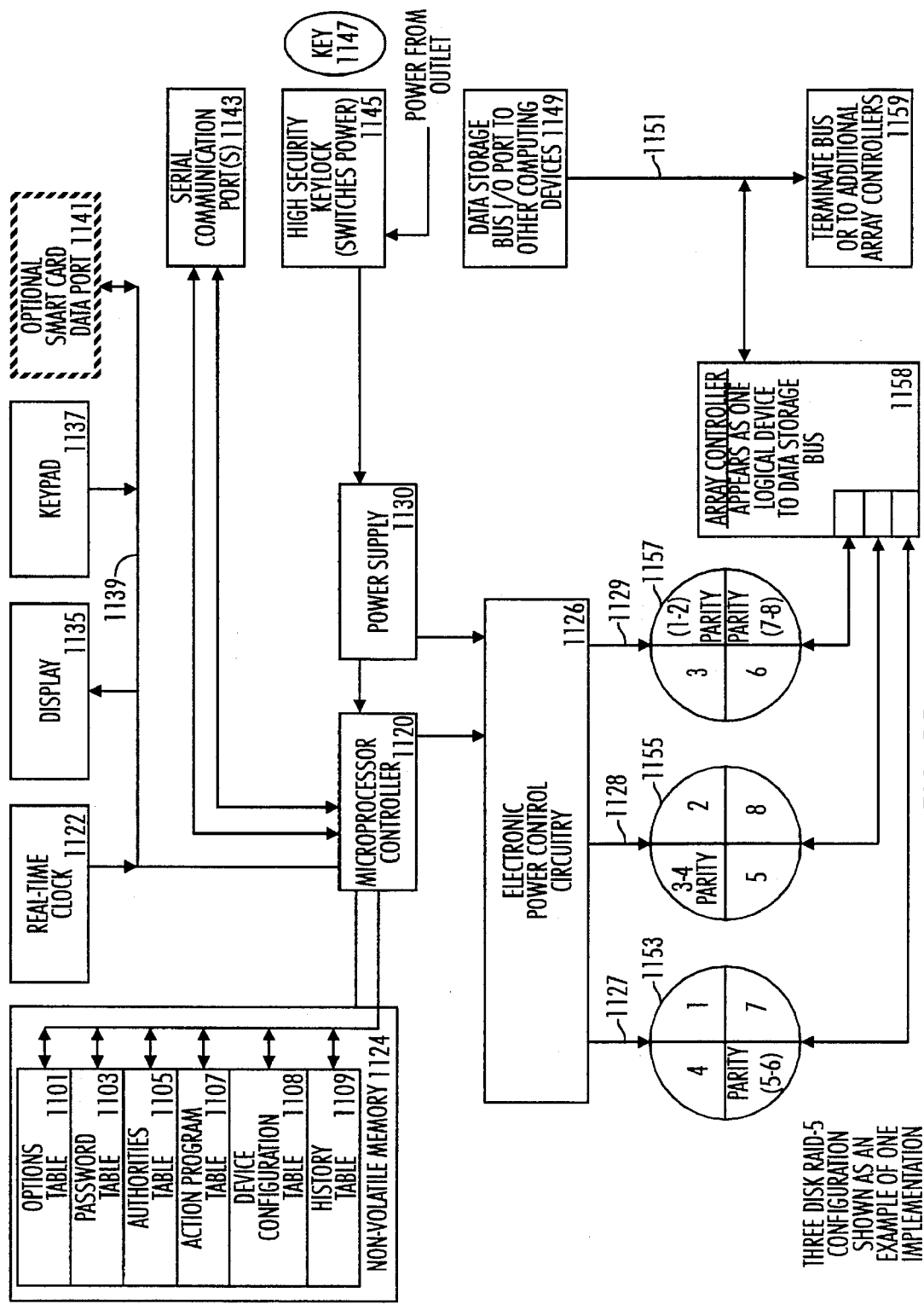
FIG. 11 is a block diagram illustrating a preferred embodiment of the present invention which employs a three-disk RAID configuration.

FIG. 11 illustrates a preferred embodiment of the invention designed to implement a three-disk RAID-5 configuration. The system is very similar to the configurations of FIGS. 7–10 with respect to the options table 1101, the password table 1103, the authorities table 1105, the actions table 1107, the device configuration table 1108, the history table 1109, non-volatile memory 1124, real-time clock 1122, display 1135, keypad 1137, optional smart card data port 1141, microprocessor controller 1120, power supply 1130, serial communication port 1143, high-security keylock 1145, key 1147, and data storage bus I/O port 1149, and data bus 139. However, the electronic power control circuitry 1126 is adapted to control power to a plurality of power supply lines 1127, 1128, 1129. The power supply lines 1127, 1128, and 1129 supply power to data storage disks 1153, 1155, and 1157, respectively. The disk memories are partitioned such that disk 1153 stores data blocks 1, 4, and 7, as well as parity for blocks 5 and 6. Disk 1155 stores blocks 2, 5, and 8, as well as parity for blocks 3 and 4. Disk 1157 stores blocks 3 and 6, as well as parity for blocks 1 and 2 and blocks 7 and 8. In this manner, the three-disk RAID-5 configuration is implemented with the capability of reconstructing a failed disk's data from the parity blocks.

The disks 1153, 1155, 1157 are accessed via an array controller 1158. The array controller 1158 communicates with a data storage bus 1151. The data storage bus may optionally be connected to additional array controllers 1159.

The security system may be employed in an environment which provides one or more fixed base units and one or more removable, docking data storage modules. Through the incorporation of embedded microprocessors, non-volatile memory I/0 ports, displays, etc. inside both the removable storage module and docking base unit, or fixed storage devices and housing, selective access control is made not only possible but practical. When a validated user requests access to any removable data storage module or base unit, the microprocessor can optionally first check the authorities table to see if a password is required, and then prompt the module for password input. Alternatively, the user can enter the password into the unit. This selective access control can take the form of limiting access to specific users, modules, base units, time slots, project groups, number of modules, insertions only, extractions only, or insertions and extractions for specified data storage modules.

Figure 12:
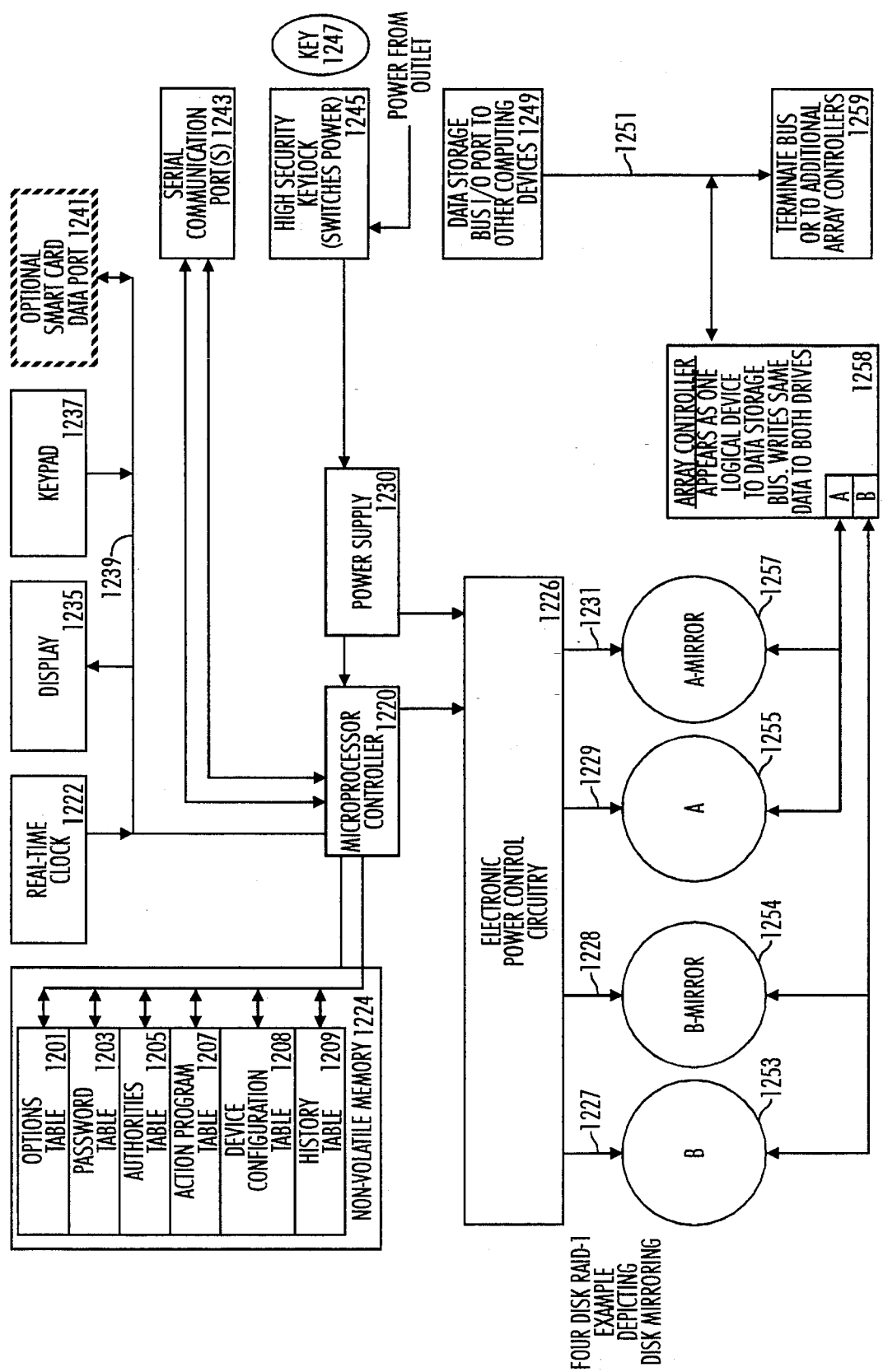
FIG. 12 is a block diagram illustrating a preferred embodiment of the security system which employs a four-disk RAID configuration using mirrored disks.

FIG. 12 illustrates a preferred embodiment of the invention which utilizes a four-disk RAID-1 data storage configuration with disk mirroring. The configuration of FIG. 12 is very similar to the configuration of FIG. 11, with respect to the options table 1201, the password table 1203, the authorities table 1205, the actions table 1207, the device configuration table 1208, the history table 1209, non-volatile memory 1224, real-time clock 1222, display 1235, keypad 1237, optional smart card data port 1241, microprocessor controller 1220, power supply 1230, serial communication port 1243, high-security keylock 1245, optional key 1247, data bus 1239, data storage bus I/0 port 1249, data storage bus 1251, array controller 1258, and optional additional array controllers 1259. However, the electronic power control circuitry 1226 is adapted to control four power supply lines 1227, 1228, 1229, and 1231. The supply lines 1227, 1228, 1229, and 1231 supply power to disk storage devices 1253, 1254, 1255, and 1257, respectively. Disks 1253 and 1254 are configured as a mirrored pair, as are disks 1255 and 1257. In this manner, a four-disk RAID-1 system using disk mirroring is implemented, where the same data is written on each of the mirrored disk pairs, allowing redundancy if one drive fails.

Figure 13:
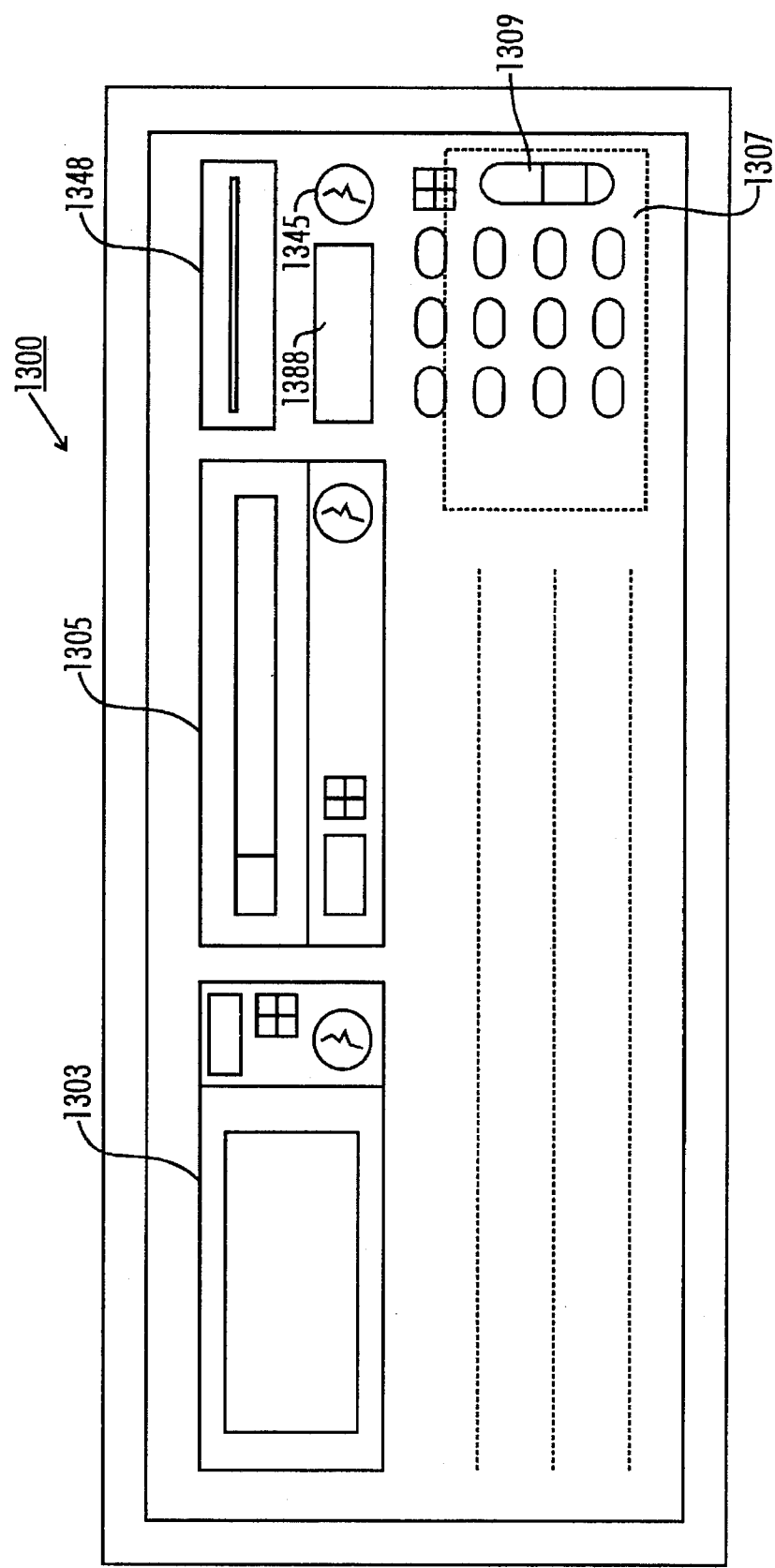
FIG. 13 is a detailed front view of a base unit constructed in accordance with the invention, with removable data storage modules locked into docking position.

FIG. 13 is a detailed front view of a base unit 1300 constructed in accordance with the invention. The base unit 1300 includes two docking ports which accept removable data storage modules 1303, 1305. The removable data storage modules 1303, 1305 are shown docked into position. Removable module 1303 includes a 3½" disk drive, whereas removable module 1305 houses a 5¼" half-high data storage drive. The base unit 1300 includes keypad input means 1307, a power switch 1309, a high-security keylock 1345, an optional floppy disk drive 1348, display means 1388, and a serial data communications port 1349. The base unit depicted in FIG. 13 also includes the circuitry mentioned above embodied on a printed circuit board. In addition, the base unit contains a power supply means to power both the data storage modules and an optional array of boards, like a SPARCstation CPU board or S-Bus expansion boards, etc.

FIG. 13 illustrates one possible base unit 1300 configuration. However, base units may be configured to provide any desired number of docking positions up to the limit of the data I/O bus and the host adapter. Base units 1300 may or may not contain microprocessors. If these base units 1300 contain circuitry described above, they may be termed "smart bases". Input means 1307 is intended to be a keypad, but may optionally be a card reading device which interprets magnetically-encoded, optically-encoded, and/or electro-magnetically-encoded signals. If the hand-held card includes a built-in microprocessor the card is referred to as a "smart card".

The base unit display means 1388 may be a CRT, an LED array, an LCD array, a fluorescent display, or any other type of display to meet specific system applications. An optional display control means 1389 may consist of push buttons, a keypad, or switches.

It should be noted that the functions and features of the base unit 1300 can be incorporated directly into a computer rack, enclosure, or work station, as shown in FIG. 13 or can be distributed through several base units or modules as desired.

In the preferred embodiment, each removable module 1303, 1305 is sized to house either 3½" or 5¼" form factor disk drives, and each bay of the base unit 1300 is sized to receive the removable modules 1303, 1305. Single-bay or multiple-bay docking bases 1300 may be fashioned as desired. The removable modules 1303, 1305 may be dimensioned to accommodate a plurality of disk drives, or be configured to accommodate different sizes of drives (e.g., a nominal 5¼ form factor removable module 1305 could also accommodate smaller form factor drives, such as 3½" drives). Similarly, the base unit 1300 may be dimensioned to accommodate removable modules of different sizes.

User-specific access allows a pre-selected user or group of users to be granted access to a particular computing device, such as a specific removable data storage system. User-specific access is granted if the data stored in the password table of the user's computing device matches or corresponds with the password table in the base unit or docking unit. Non-volatile memory in the present invention, possession of a high security key, such as a Medico key, and possession of the module itself, provides one level of security. There are alternate input means, including but not limited to password, mechanical keyboard, user thumbprint, user's voice, retinal scan, magnetic strip on card, or non-volatile, programmable electronic memory card identification, including $E^EPROM$, flash memory, SRAM, battery backed DRAM, etc. Thus, the user may or may not have to enter a password into the base unit 1300, depending upon the premises set up in the password table (FIG. 2).

Module-specific access allows programmable serial-number control of which computing device, i.e. module 1303, 1305, is allowed to be used by whom, and in conjunction with which specific additional computing devices, i.e., base units 1300. Module-specific access is granted after a module ID code matches that in non-volatile memory (124, FIG. 7) of the base unit 1300. Alternatively, the user may be required to correctly enter a password into a computing device to gain system access. These alternate input means include, but are not limited to, password, mechanical key, or non-volatile, programmable electronic memory card identification. (The modules 1303, 1305 may have a unique module identification number engraved on the front of each module which allows positive identification and tracking of modules.)

Base-specific access allows pre-selecting which removable storage module 1303, 1305 will function with which base unit 1300. This very powerful security tool limits the potential for lost data through theft, etc. Base-specific access is granted after the data stored in the password table of the user's computing device is successfully compared with the information stored in the password table of the computing device the user desires to access. There are alternate input means by which the user can enter the password information into the computing device he or she desires to access. These input means include, but are not limited to, password, mechanical key, or non-volatile, programmable electronic memory card identification.

Time-specific access functionality is enabled through incorporation of a real time clock (122, FIG. 7) inside either the base unit 1300, the module 1303, or both. This feature allows pre-selecting which time period any removable storage module 1303, 1305 will be operable with a specific user, base unit 1300, project, etc. This very powerful security tool limits the potential for lost data during "off hours" through theft, etc. Time-specific access is granted after a successful comparison of the appropriate password table data fields, as discussed with reference to FIG. 2.

Project-specific access allows pre-selecting which removable storage modules 1303, 1305 will be usable on which projects. This very powerful security tool allows tight controls for compartmented data, giving the security officer greater control over users inadvertently allowing sensitive project data to be exposed to unauthorized personnel. Project-specific access is granted after a successful comparison of the appropriate password table fields.

Many alternate inputs means exist, including, but not limited to, numeric keypad entry of numeric password, alpha-numeric keypad entry of alpha-numeric password, high-security versions of mechanical keys and keylocks (e.g. Medico keylocks with multiple tumblers that require both radial and angular displacements of the tumblers as opposed to straight displacements in standard keylocks), user thumbprint, user's voice, retinal scan, or any type of non-volatile, programmable electronic memory cards (e.g. embedded EEPROM, battery-backed DRAM, static RAM, or non-volatile, programmable electronic memory card identification). These means may be coupled together to give exponentially higher levels of security. For instance, requiring both a high-security key/key/lock coupled with a user password would have higher security than either would individually.

Utilization of a non-volatile, optional programmable electronic memory card (hereafter referred to as a Smart Card) provides some very novel and inventive opportunities for system security within a removable storage system. The Smart Card can either be programmed within the confines of the secure vault area by the security officer or pre-programmed off-site with data that defines the User ID, Module ID, Base ID, Time-Validation-Code or Time-Stamp, Project Code, Access Means, and/or Access-Count The user would receive from the security officer an updated Smart Card at the time the user checks out removable storage modules(s). Possession of the Smart Card is required so that Smart Card can be inserted into the base unit before authorized operation can commence. Optionally, it is obvious that the Smart Card could be inserted into the modules also. Further security would be provided by having the system read the authorizations on the card and perform comparisons of the actual system present with the authorized system setup. If anything is determined to be amiss, the base unit (or optionally, the module) can then invalidate the card through erasure of data on the card, modification of data on the card, or physically preventing the user from receiving the card back from the base unit (or optionally from the module). Yet further security could be optionally provided by requiring a security officer be present and insert a Restricted Smart Card before the user inserts his/her Smart Card. A natural extension of this concept is to have side-by-side slots in the base unit and require simultaneous insertion of cards before access can be granted.

Options for smart key utilization here include, but are not limited to: Data Key's Data key product family, which generally embeds EEPROM, One Time Programmable, or Flash Memory IC's into various carrier devices; Tracor Ultron's Smart Key product family, which embeds EEPROM into a plastic carrier; and/or Atmel's PEROM technology which utilizes 5 Volt flash memory technology.

The security system of the present invention provides means for positively determining, recording in the history table, and subsequently providing an indication of the number of access cycles a particular computing device has undergone, in the form of the password table (FIG. 2). This counting feature is especially useful where fixed base units and removable data storage devices are employed. The security officer can check any removable data storage module in or out while noting the Access Cycle Count number, an immediate "flag" that explanations are in order if the count has incremented by more than one during the time the module was checked out. A removable data storage module data requires typically the platter spin-up voltage by fully on (+12 V in most current data storage devices, but +5 V in the case of some future, smaller form factor data storage devices) so the monitoring of this voltage by the module's internal microprocessor is obvious. What is non-obvious is that the platter spin-up voltage going from Low to High to Low is not by itself sufficient to positively prove that one access code has occurred. For instance, power outages, power glitches, pulled power plugs, and any number of events outside the control of the user could cause unnecessary paperwork, etc. Therefore, it is imperative that a second means be provided which, in conjunction with the platter spin-up voltage history, can help positively determine whether the Access Cycle Count should be incremented. The counter input can be AND'd with the platter spin-up voltage history inside the microprocessor to provide this positive count increment signal to the counter. This second means can take a number of forms, including but not limited to an indication of latching handle position history, an indication of module/base unit relative position history, an indication of module/base unit locking mechanism position history, etc. The count can be stored in an electronic format, including the history table, or optionally, electromechanical or mechanical counters can be utilized which preferably provide an indication of reverse activation, and attempts which will increment the count via rotary or linear solenoid actuation based upon the microprocessor output in the case of the electromechanical counter. Alternatively, the memory of the microprocessor can be updated, allowing the Access Cycle Count to be displayed on either an LCD, EL, LED, fluorescent or other suitable type of display. Lower power displays can utilize a battery for constant display, which the higher current draw displays can optionally (if battery life is a concern) have a display activation button allowing momentary display while the display activation button is depressed.

The security system provides a feature which permits the security officer to monitor work in process, receiving updates as to actual versus planned implementation of the security officer's work plan for the shift, day, or appropriate time period. Two serial ports may be provided on the base unit 1300 (FIG. 13) that will allow the security officer to make routine "rounds" and physically connect a portable device that would record any or all of these above-listed in process variables. One serial port allows communication with other base units 1, and the second port allows communication with a host CPU. It is obvious that this connection could also be accomplished remotely over an electronic wire network connection or Radio Frequency (i.e., RF) connection. The security officer can also utilize a graphic display provided on the base unit to toggle through the various permissions, optionally recording them in his/her personal logbook.

Monitoring access privileges provides a level of security for removable data storage systems that allows real time compartmentalization and sub-compartmentalization of data. The serial port is a powerful concept that allows the security officer to modify any of the "permissions" or privileges initially granted at the time the user checked out the modules. Of course, Serial Port, RF, or other means could be utilized to achieve this modification, including requiring users to either periodically or randomly turn in their modules to receive updated data. Since the users don't know when these updates will occur or be required, and since updates can either leave permissions or privileges the same or change them, the security officers have further improvements in system security.

Display means utilized in conjunction with keyboard input will allow authorized users, security officers, etc. to query the computing device for information about not only itself, but any other computing devices, base units, users, projects, etc. that have been in "contact" with that device. It is envisioned that this display will be an AMLCD (Active Matrix Liquid Crystal Display), LED, or EL-type. The display may also be graphics in nature (i.e., individually addressable pixels) to allow flexibility in information display using icons, text, color, and numbers without the limitations of pre-selected characters. The keypad will consist of at least 6 keys, but preferably more than 10, and will be implemented in either conductive rubber, snap dome, or touch-panel technologies. The keypad is used to enter input and/or to select a desired display mode.

Another feature of this invention is that it provides the security officer the ability to record and archive the historical use log of any or all of the above data. Knowledge by the security officer of who used specific computing devices, the base unit which was used in conjunction with the specific computing device, the time of the usage, the project for which the usage was granted, and how many times the computing device was used, can be particularly useful in tracking use trends for system administration purposes, capital equipment deficiencies, and/or security leak sources.

Utilization of an internal microprocessor with non-volatile memory, Smart Card, or similar means provides a very convenient means for updating the information at session end. This updating will allow the security officer to perform subsequent archival of this data in a variety of manners. Part of the power-down circuitry and commands inherent with computing devices such as base units and data storage modules includes a refresh point to assure that these data are brought current. Key information includes any combination relating, but not limited, to the Last Use of any given removable storage module with which base unit by whom over what period of time on which project using which key over how many access cycles. More robust means for backing up this above-described data can be incorporated than the portable, real-time monitoring means described above. These more robust means can include a printer, plotter, or other means of providing hardcopy output capable of being archived. If desired, the invention may be packaged to meet the TEMPEST standard for electromagnetic interference.

The present invention provides various security features which may be incorporated into the systems shown in FIGS. 7–13. Once such security feature is the addition of one or more counters (mechanical or electrical) to indicate (1) the number of insertions of a removable module 1303, 1305 into a base unit 1300, and/or (2) the number of times a disk drive within a removable module 1303, 1305 is powered up or down. Such a counter may be integrated into a removable module 1303, 1305, or affixed within a base unit 1300 docking bay. The counter may optionally have a display to indicate the count value. In the preferred embodiment of the invention, an electronic counter circuit is provided, which includes non-volatile memory for storing the number of times the removable module 1303, 1305 is inserted and/or removed from the base unit 1300.

Figure 14:
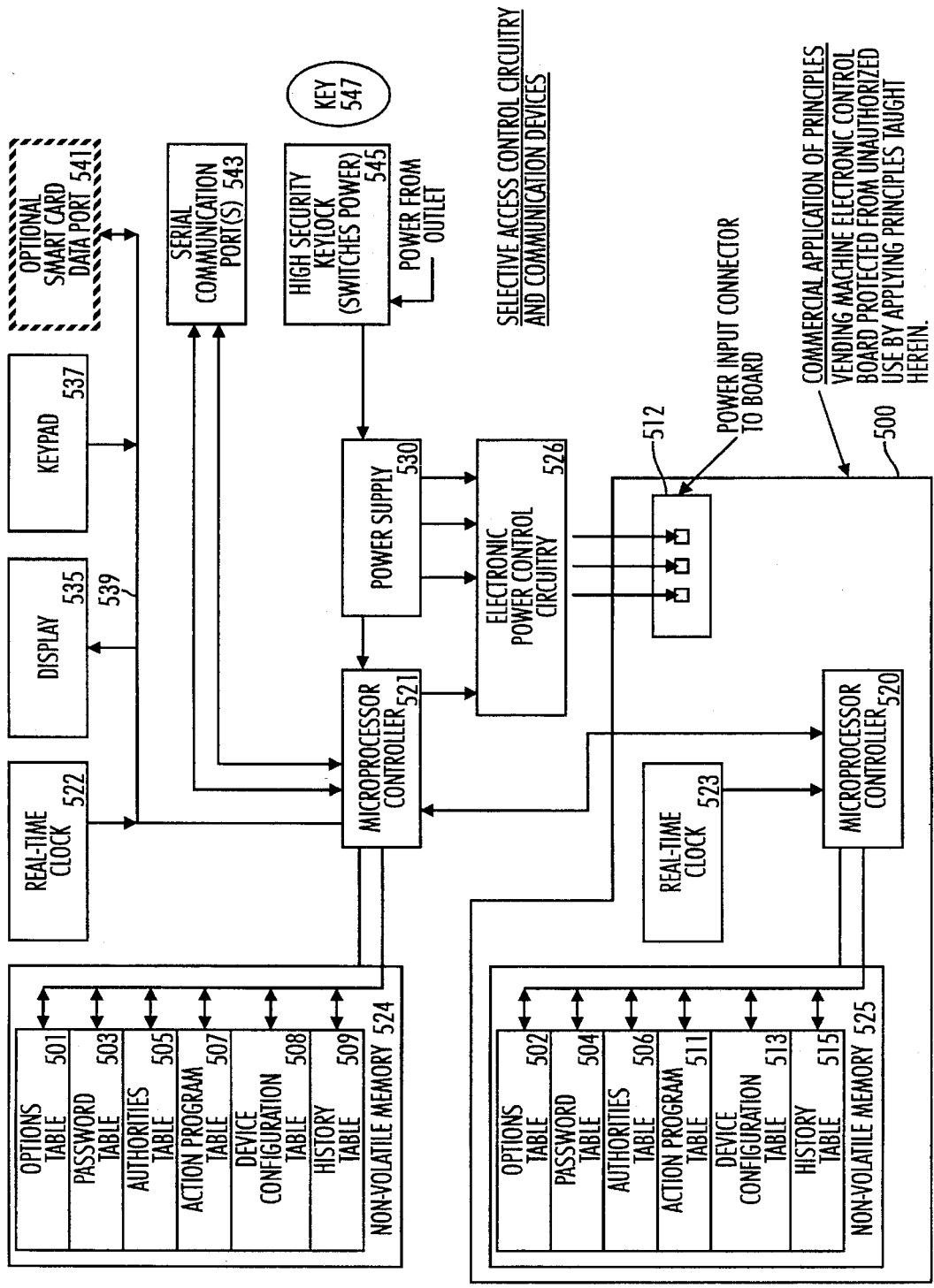
FIG. 14 is a block diagram illustrating a preferred embodiment of the invention employed in the context of a device which consumes electrical power.

The configuration depicted in FIG. 14 demonstrates how the principles taught herein can be easily applied to various devices which consume electrical power such as vending machines. The vending machine contains an electronic control board 500 which provides selective access control and historical recording of such accesses and access attempts. The tables in non-volatile memory 524, the real-time clock 522, the optional additional circuitry on the actual electronic control board 500 the non-volatile memory 525, time clock 525 and microprocessor controller 520 work tollstopper to determine whether a particular service person is allowed access specific portions of a vending machine at a particular time, at a particular site.

A display 535, keypad 537 and optional smart card data port 541 are included, along with a high security tamper proof keylock 545 and key 547, to provide better input/output of access control information and physical security of the vending machine's controller circuitry.

Upon successfully passing the designated access algorithm, the microprocessor controller 521 sends a signal to the electronic power control circuitry 526 authorizing the control circuitry 526 to pass power to other functional circuitry on the vending machine's electronic control board 500, and/or other functional circuitry within the vending machine.

A number of embodiments of the present invention have been described. Nevertheless, it will be understood that various modifications may be made without departing from the spirit and scope of the invention. For example, although the illustrated embodiment has been described in the context of magnetic disk drive data storage devices, the invention could easily be adapted to other data storage devices, such as write-once-read-mostly (WORM) optical drives and erasable optical drives. Accordingly, it is to be understood that the invention is not to be limited by the specific illustrated embodiment, but only by the scope of the appended claims.

We claim:

1. An apparatus for regulating use of and access to a particular portable computing device in association with other computing devices, at least some of the computing devices including the portable computing device having a unique identifier stored within the computing device and having means for providing the unique identifier to other computing devices, the apparatus including:

a. an electronic means, configured to be coupled to the portable computing device for selectively enabling at least portions of the portable computing device;

b. a memory for storing system parameters indicative of whether selected other computing devices and users are authorized to use and access the portable computing device;

c. a controller coupled to the electronic means for enabling at least portions of the portable computing device and receiving system parameters from the memory and causing the electronic means to enable the portions of the computing device if one of a permitted group of the other computing devices or a user is attempting to use the portable computing device, and the system parameters indicate that such other computing device or user is authorized to use the portable computing device.

2. The apparatus as set forth in claim 1 wherein the computing device is selected from the group consisting of microprocessors, data storage devices, central processing units, input/output buses, input/output controllers, read-only memories, random-access memories, EPROMS, and E²PROMS.

3. The apparatus as set forth in claim 1 wherein the computing device is a removable data storage drive.

4. The apparatus of claim 1, wherein the memory includes a history table for storing user definable records setting forth the usage history of the portable computing device.

5. The apparatus of claim 4, wherein the history table includes at least:
   (a) a log of all individuals who have accessed, or attempted to access at least one of the computing devices;
   (b) the time of each access, or attempt to access, at least one of the computing devices;
   (c) the purpose of the access, or attempt to access, at least one of the computing devices;
   (d) the project associated with the access, or attempt to access, at least one of the computing devices;
   (e) the total number of attempts to access at least one of the computing devices; and
   (f) the total number of successful accesses of at least one of the computing devices.

6. The apparatus of claim 5, wherein at least some of the other computing devices have a memory and the other computing device being used with the portable computing device stores the time when the portable computing device is being used with said other computing device.

7. The apparatus of claim 4, wherein the history table includes at least:
   (a) a log of all individuals who have attempted to access at least one of the computing devices;
   (b) the time of each attempt to access at least one of the computing devices;
   (c) the purpose of each attempt to access at least one of the computing devices;
   (d) the project associated with each attempt to access at least one of the computing devices;
   (e) the total number of attempts to access at least one of the computing devices; and
   (f) the total number of successful accesses of at least one of the computing devices.

8. The apparatus of claim 4, wherein the memory includes an options table for storing system parameters for each user, the parameters for each user including at least:
   (a) a field for identifying the user as authorized;
   (b) a field for storing a value indicating which data entries in the non-volatile memory can be displayed to the user;
   (c) a field for storing a value indicating which data entries in the non-volatile memory can be altered by the user.

9. The apparatus of claim 1, wherein one of the parameters stored in the memory of the portable computing device is an identifier for the portable computing device and the other computing device receives said identifier from the portable computing device when it is being used with the portable computing device.

10. The apparatus of claim 1, further including a serial port, coupled to the controller, for transmitting serial data from the controller to at least one external device,
   wherein the memory further includes a value indicating which data entries of the memory can be transmitted through the serial port.

11. The apparatus of claim 1, wherein the system parameters further include:
   (a) at least one value indicating at least one type of data that causes the controller to cause the electronic means to couple a computing device to a power supply if an attempt is made to access such types of data from the computing device.

12. The apparatus of claim 11, wherein the system parameters further include:
   (a) at least one value associated with at least one computing device, each such value indicating a maximum number of concurrent users that can use each associated computing device, such that attempts to use the at least one computing device by a number of users in excess of the maximum number result in the electronic means disabling the associated computing device if such attempts by those users in excess of the maximum number.

13. The apparatus of claim 12, wherein the system parameters further include:
   (a) a value indicating types of data that, if transferred to at least one selected computing device, cause the controller to cause the electronic means to enable the computing device to such that the computing device accepts such data.

14. The apparatus of claim 13, wherein the system parameters further include:
   (a) a value indicating types of data that, if transmitted to, or from, at least one selected computing device over a serial port, cause the controller to cause the electronic means to enable the computing device such that the computing device accepts, or outputs, such data.

15. The apparatus of claim 1, further including a real-time clock coupled to the controller indicating the time of day,
   wherein the controller causes the electronic means to enable at least one of the computing devices to, and disable at least one computing device in response to the output of the real-time clock and the system parameters.

16. The apparatus of claim 1, wherein the memory further includes a password table for storing a password associated with at least one user, site, project, or computing device, which password is provided to the controller, and which password must be provided by a user, together with a value identifying the associated user, site, project, or computing device, to enable the controller to cause the electronic means to couple the associated computing device, or any computing devices to be accessed in conjunction with a site, project, or user associated with the password, to a power supply during attempt by the user to access such computing devices.

17. The apparatus of claim 1, wherein the memory further includes a password table for storing a password associated with at least one user, site, project, or computing device, which password is provided to the microprocessor, and which password must be provided by a user to disable the controller from causing the electronic means from disabling the associated computing device to be accessed in conjunction with a site, project, or user associated with the password, from at least one of the power supplies during attempts by the user to access such computing devices.

18. The apparatus of claim 1, wherein:
   (a) the memory further includes an authorities table for storing:
      (1) a list of authorized users;
      (2) data block constraints associated with at least one of the listed authorized users;
      (3) time block constraints associated with at least one of the listed authorized users; or
      (4) computing device access constraints associated with at least one of the listed authorized users;
   (b) the controller reads the authorities table and causes the electronic means to enable the computing device to at least one of the power supplies only if:
      (1) a user requests access to the computing device;
      (2) the user is on the list of authorized users; and (3) access of the at least one computing device does not violate any of the constraints associated with the user and the computing device.

19. The apparatus of claim 18, wherein the authorities table further includes operational codes that invoke user-defined algorithms in response to a user log-on.

20. The apparatus of claim 1, wherein the non-volatile memory further includes an action program table for storing information that determines how the system reacts to particular events and conditions, including at least:
   a. an operations code field for storing opcodes associated with actions;
   b. a user-defined A field; and
   c. a user-defined B field.

21. The apparatus of claim 20, wherein the action program table further includes a description field for storing a description of the action associated with the opcode stored in the operations code field.

22. The apparatus of claim 1, wherein the non-volatile memory further includes a configuration table for storing a first unique device identification number which identifies the apparatus to other external devices, and for storing at least a second unique device identification number associated with each computing device that may be used in conjunction with the apparatus.

23. The apparatus of claim 22, wherein the configuration table further includes a preference sub-table for storing a list of device address identification number preferences listed in preferential order associated with devices accessing the system I/O bus.

24. The apparatus of claim 1, further including at least one sensor coupled to the controller, for determining environmental conditions and communication such conditions to the controller, beginning from the time the apparatus is shipped from the manufacturer, wherein the controller records the environmental condition in the memory.

25. The apparatus of claim 24, further including a real-time clock, coupled to the controller, for determining the relative time at which events occur and communicating the time to the controller,
   wherein the time is associated with the environmental conditions and are recorded in the memory.

26. An apparatus for securing access to a computing device, including:
   a. a docking base unit, including:
      i. a first non-volatile memory for storing a first set of system parameters indicative of whether users are authorized to use and access particular computing devices; and
      ii. first microprocessor, coupled to the first non-volatile memory, for:
         (1) reading at least a portion of the first set of system parameters;
         (2) determining whether an attempt to access a computing device is authorized; and
         (3) outputting a signal when a user attempts to access a particular computing device which the user is authorized to access, such authorization being determined by the read first set of system parameters;
   b. a removable computing device module removably coupled to the docking base unit, including:
      i. a second non-volatile memory for storing a second set of system parameters;
      ii. at least one computing device;
      iii. electronic power controller, configured to be coupled to at least one of the computing devices and at least one power supply, for coupling at least one selected computing device to at least one selected power supply to allow an authorized user to access and use the at least one selected computing device; and
      iv. a second microprocessor, coupled to the second non-volatile memory, and the electronic power controller, for:
         (1) receiving at least a portion of the second set of system parameters from the second non-volatile memory;
         (2) receiving the signal output by the first microprocessor; and
         (3) transmitting signals to the electronic power control to cause the electronic power controller to couple at least one selected computing device to at least one selected power supply, if the second microprocessor determines that the user is authorized to use the computing device, and the first microprocessor has output a signal to the second microprocessor indicating that a user has attempted to access a computing device and is authorized to access the computing device.

27. An apparatus for monitoring use of a removable computing device in association With other computing devices, including:
   (A) a docking base unit, including:
      I. a first non-volatile memory for storing a first set of parameters including a unique identifier for the docking base unit; and
      ii. a first microprocessor, coupled to the first non-volatile memory for:
         (1) reading at least a portion of the first set of system parameters;
         (2) determining which removable computing device is accessing the docking station; and
         (3) providing a signal upon request regarding which particular portable computing device is accessing the docking station;
   (b) the removable computing device module removably coupled to the docking base unit, including:
      I. a second non-volatile memory for storing a second set of parameters including a unique identifier for the removable computing device;
      ii. a second microprocessor, coupled to the second non-volatile memory and to the first microprocessor, for:
         (1) receiving at least a portion of the second set of the parameters from the second non-volatile memory; and
         (4) transmitting signals to the first microprocessor to cause the microprocessor electronic power controller to couple at least one selected computing device to at least one selected power supply, if the second microprocessor determines that the removable data storage module is authorized to interface with the docking base unit.

28. The apparatus of claim 27, wherein the computing device is a data storage unit.

29. The apparatus of claim 27, wherein at least one of the memories include a history table for storing user definable records setting forth the usage history of at least one computing device.

30. The apparatus of claim 29, wherein the history table includes:
   (a) a log of all individuals who have accessed, or attempted to access, at least one of the computing devices;

(b) the time of each access, or attempt to access, at least one of the computing devices;

(c) the purpose of the access, or attempt to access, at least one of the computing devices;

(d) the project associated with the access, or attempt to access, at least one of the computing devices;

(e) the total number of attempts to access at least one of the computing devices; and (f) the total number of successful accesses of at least one of the computing devices.

31. The apparatus of claim 27, wherein:

(a) the first controller transmits at least a portion of the first set of to the second controller; and (b) the second controller cross-validates the received portion of the first set of parameters against a corresponding portion of the second set of system parameters read by the second controller, and allows the portable computing device to operate further only if the received portion of the first set of system parameters concur with the portion of the second set of system parameters read from the second memory by the second controller.

32. The apparatus of claim 31, wherein the first and second system parameters each include:

(a) at least one value indicating at least one type of data that causes the second controller to enable the portable computing device;

(b) at least one value associated with the portable computing device, each such value indicating a maximum number of concurrent users that can use the portable computing device, such that attempts to use the portable computing device by a number of users in excess of the maximum number result in disabling the portable computing device during such attempts by those users in excess of the maximum number;

(c) a value indicating types of data that, if transferred to the portable computing device, cause the controller to cause the portable computing device to accept such data; and (d) a value indicating types of data that, if transmitted to, or from, a computing device over a serial port, cause the controller to cause the portable computing device to accept, or output, such data.

33. The apparatus of claim 27 wherein the computing device is selected from the group consisting of microprocessors, data storage devices, central processing units, input/output buses, input/output controllers, read-only memories, random-access memories, EPROMS, and $E^2$PROMS.

34. The apparatus of claim 27, wherein the second controller receives the docking base unit identifier from the first controller and inhibits the portable computing device if the second controller determines that the portable computing device is not authorized to interface with the docking base unit.

35. The apparatus of claim 27, wherein whether the portable computing device is attached to the base docking unit can be determined from the signal from the first controller.

* * * * *